US012606211B2

(12) United States Patent
Gerban et al.

(10) Patent No.: US 12,606,211 B2
(45) Date of Patent: Apr. 21, 2026

(54) CLOUD-BASED ELECTRIC VEHICLE BATTERY OPTIMIZATION SYSTEMS AND METHODS

(71) Applicant: Mercedes-Benz Group AG, Stuttgart (DE)

(72) Inventors: Mark Gerban, Hamburg (DE); André Möller, Stuttgart (DE); Abhishek Mantha, Upland, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 278 days.

(21) Appl. No.: 18/417,842

(22) Filed: Jan. 19, 2024

(65) Prior Publication Data

US 2025/0236315 A1     Jul. 24, 2025

(51) Int. Cl.
| | |
|---|---|
| *B60W 60/00* | (2020.01) |
| *B60L 58/12* | (2019.01) |
| *B60W 50/00* | (2006.01) |
| *B60W 50/04* | (2006.01) |

(52) U.S. Cl.
CPC ......... *B60W 60/0023* (2020.02); *B60L 58/12* (2019.02); *B60W 50/0097* (2013.01); *B60W 60/0021* (2020.02); *B60L 2240/80* (2013.01); *B60W 2050/046* (2013.01); *B60W 2556/45* (2020.02); *B60W 2756/10* (2020.02)

(58) Field of Classification Search
None
See application file for complete search history.

(56) References Cited

U.S. PATENT DOCUMENTS

| | | | | |
|---|---|---|---|---|
| 2018/0307244 A1* | 10/2018 | Dierker | ............... | G05D 1/0011 |
| 2023/0060383 A1* | 3/2023 | Ma | ....................... | B60W 50/023 |
| 2023/0066189 A1* | 3/2023 | Ma | ....................... | B60W 50/045 |

FOREIGN PATENT DOCUMENTS

KR          20230048712 A          4/2023

OTHER PUBLICATIONS

CYNGN, "Transform Your Industrial Vehicles into AI-Powered Autonomous Workhorses", https://www.cyngn.com/, retrieved on Nov. 29, 2023, 10 pages.

* cited by examiner

*Primary Examiner* — Anshul Sood
*Assistant Examiner* — Wenyuan Yang
(74) *Attorney, Agent, or Firm* — Dority & Manning, P.A.

(57) ABSTRACT
An example computing system may be configured to obtain sensor data associated with the vehicle and determine an estimated energy usage for performing a computation onboard the vehicle using the sensor data. The estimated energy usage is indicative of an estimated amount of energy from one or more batteries of the vehicle for performing the computation using the sensor data. The computing system can determine, based on the estimated energy usage, that performance of the computation using the sensor data is to be offloaded to a remote computing system that is remote from the vehicle. In response to determining that the computation using the sensor data is to be offloaded to the remote computing system, the computing system can generate a sensor data payload indicative of the sensor data and output, over a communication network, the sensor data payload to the remote computing system.

20 Claims, 12 Drawing Sheets

200

SW BASE LAYER
210

HW BASE LAYER
205

230

220

225

HW BASE
LAYER
205

COMPUTING
HARDWARE
215

245

240 — APPLICATION LAYER AND USER INTERFACE

235C

235B

235A

SW BASE LAYER 210

VEHICLE COMPUTING SYSTEM 200

305 — SENSOR SYSTEM(S)          SENSOR DATA — 310

315 — POSITIONING SYSTEM        LOCATION DATA — 320

325 — COMM. SYSTEM             PLATFORM DATA — 330

340 — HMI SYSTEM               CONTENT — 335

360 — AUTONOMY SYSTEM          AUTONOMY DATA — 365

CONTROLLER 355A      CONTROLLER 355B      CONTROLLER 355C

VEH. FUNC. 350A      VEH. FUNC. 350B      VEH. FUNC. 350C

405

415

425

435

445

455

COMPUTING PLATFORM 110

VEHICLE SOFTWARE

REMOTE ASSIST. SYS.

SECURITY SYSTEM

NAVIGATION SYSTEM

ENTERTAINMENT SYSTEM

OTHER SUPPORT SYSTEMS

SOFTWARE UPDATES

ASSISTANCE DATA

SECURITY DATA

MAP DATA

ENTERTAINMENT DATA

VEHICLE SUPPORT DATA

410

420

430

440

450

460

USER DEVICE 115

DISPLAY DEVICE

USER INTERFACE

APPLICATION

500

505

510

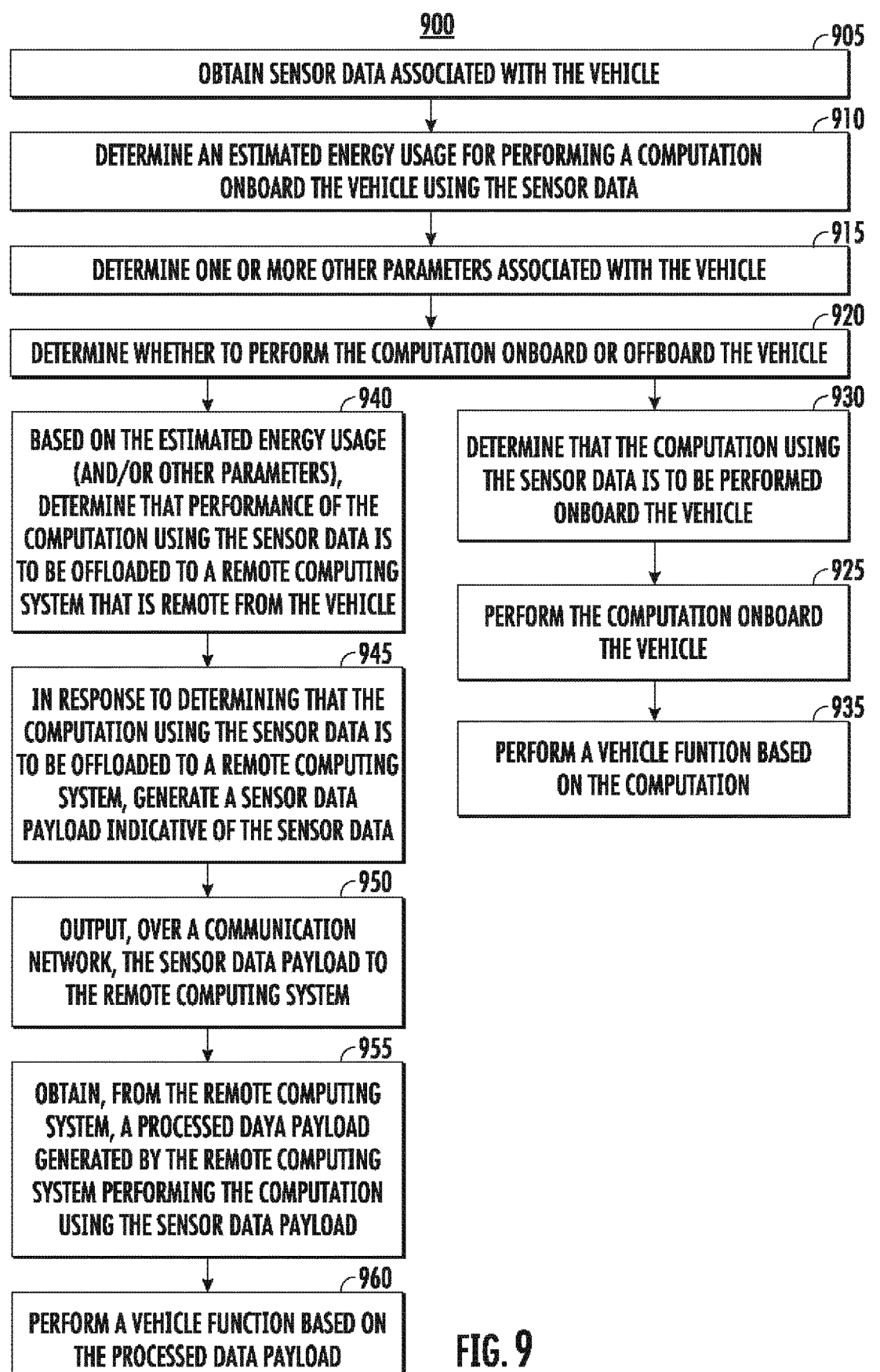

900

905
OBTAIN SENSOR DATA ASSOCIATED WITH THE VEHICLE

910
DETERMINE AN ESTIMATED ENERGY USAGE FOR PERFORMING A COMPUTATION ONBOARD THE VEHICLE USING THE SENSOR DATA

915
DETERMINE ONE OR MORE OTHER PARAMETERS ASSOCIATED WITH THE VEHICLE

920
DETERMINE WHETHER TO PERFORM THE COMPUTATION ONBOARD OR OFFBOARD THE VEHICLE

940
BASED ON THE ESTIMATED ENERGY USAGE (AND/OR OTHER PARAMETERS), DETERMINE THAT PERFORMANCE OF THE COMPUTATION USING THE SENSOR DATA IS TO BE OFFLOADED TO A REMOTE COMPUTING SYSTEM THAT IS REMOTE FROM THE VEHICLE

945
IN RESPONSE TO DETERMINING THAT THE COMPUTATION USING THE SENSOR DATA IS TO BE OFFLOADED TO A REMOTE COMPUTING SYSTEM, GENERATE A SENSOR DATA PAYLOAD INDICATIVE OF THE SENSOR DATA

950
OUTPUT, OVER A COMMUNICATION NETWORK, THE SENSOR DATA PAYLOAD TO THE REMOTE COMPUTING SYSTEM

955
OBTAIN, FROM THE REMOTE COMPUTING SYSTEM, A PROCESSED DAYA PAYLOAD GENERATED BY THE REMOTE COMPUTING SYSTEM PERFORMING THE COMPUTATION USING THE SENSOR DATA PAYLOAD

960
PERFORM A VEHICLE FUNCTION BASED ON THE PROCESSED DATA PAYLOAD

930
DETERMINE THAT THE COMPUTATION USING THE SENSOR DATA IS TO BE PERFORMED ONBOARD THE VEHICLE

925
PERFORM THE COMPUTATION ONBOARD THE VEHICLE

935
PERFORM A VEHICLE FUNTION BASED ON THE COMPUTATION

FIG. 9

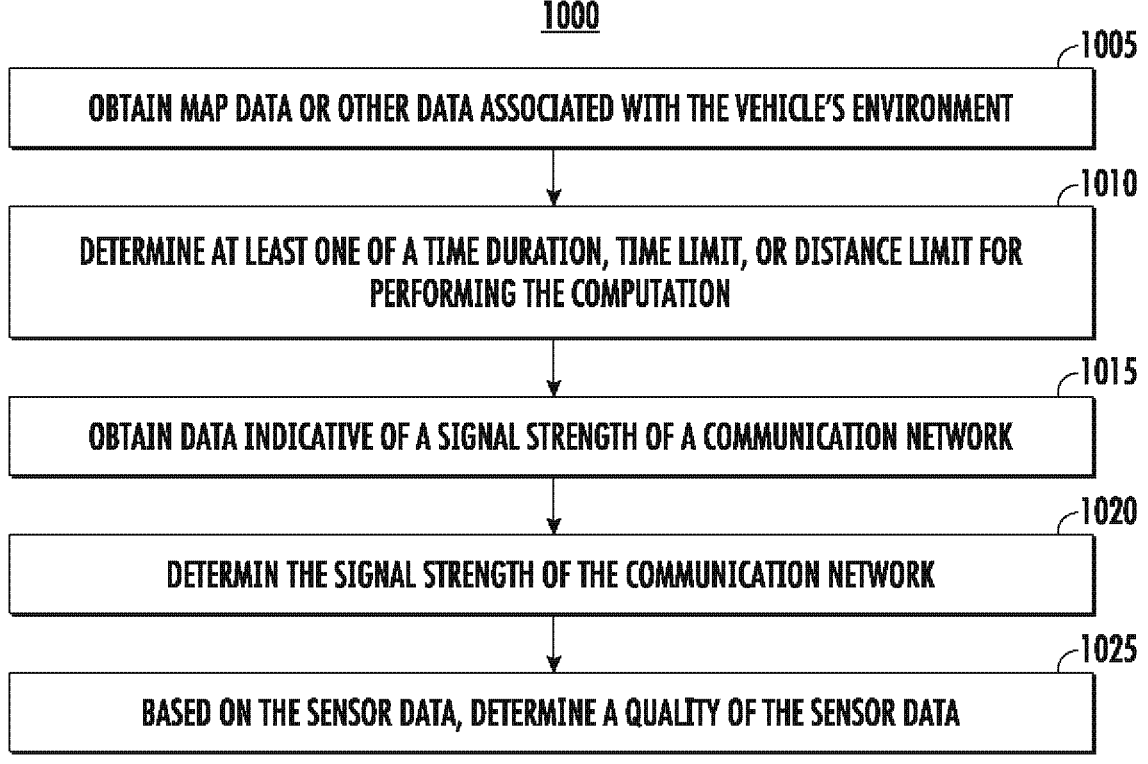

1000

1005
OBTAIN MAP DATA OR OTHER DATA ASSOCIATED WITH THE VEHICLE'S ENVIRONMENT

1010
DETERMINE AT LEAST ONE OF A TIME DURATION, TIME LIMIT, OR DISTANCE LIMIT FOR PERFORMING THE COMPUTATION

1015
OBTAIN DATA INDICATIVE OF A SIGNAL STRENGTH OF A COMMUNICATION NETWORK

1020
DETERMIN THE SIGNAL STRENGTH OF THE COMMUNICATION NETWORK

1025
BASED ON THE SENSOR DATA, DETERMINE A QUALITY OF THE SENSOR DATA

1105 — IS SIGNAL STRENGTH SUFFICIENT?

1110 — COMPUTATION POSSIBLE WITHIN TIME/DISTANCE LIMITS?

1115 — IS QUALITY OF SENSOR DATA SUFFICIENT?

1120 — IS OFFBOARD COMPUTATION MORE ENERGY EFFICIENT?

925

OBTAIN SENSOR DATA
1135

940

CLOUD-BASED ELECTRIC VEHICLE BATTERY OPTIMIZATION SYSTEMS AND METHODS

FIELD

The present disclosure relates generally to load balancing the computations of an electric vehicle to increase the energy efficiency of the vehicle's batteries. More particularly, the present disclosure relates to intelligently leveraging the computing resources onboard the vehicle, as well as off-board the vehicle, to improve the energy usage of the vehicle's batteries.

BACKGROUND

A growing application for rechargeable batteries is that of electric vehicles. Fully electric and hybrid electric vehicles utilize batteries positioned onboard the vehicle. The rechargeable batteries of such a vehicle can be used for a variety of functions including providing power for propulsion, lighting, entertainment, onboard processing, and other computing and electronic tasks.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit including one or more processors configured to perform operations to cause the computing system to: obtain sensor data associated with the vehicle; determine an estimated energy usage for performing a computation onboard the vehicle using the sensor data, wherein the estimated energy usage is indicative of an estimated amount of energy from one or more batteries of the vehicle for performing the computation using the sensor data; based on the estimated energy usage, determine that performance of the computation using the sensor data is to be offloaded to a remote computing system that is remote from the vehicle; in response to determining that the computation using the sensor data is to be offloaded to the remote computing system, generate a sensor data payload indicative of the sensor data; and output, over a communication network, the sensor data payload to the remote computing system.

In some implementations, the one or more processors are further configured to perform operations to cause the computing system to: obtain, from the remote computing system, a processed data payload generated by the remote computing system performing the computation using the sensor data payload; and perform a vehicle function based on the processed data payload.

In some implementations, the vehicle is an autonomous vehicle, and the vehicle function is an autonomy function of the autonomous vehicle.

In some implementations, the one or more processors are further configured to perform operations to cause the computing system to: determine a time duration for performing the computation onboard the vehicle using the sensor data; and determine, also based on the time duration for performing the computation onboard the vehicle, that the performance of the computation using the sensor data is to be offloaded to the remote computing system.

In some implementations, the one or more processors are further configured to perform operations to cause the computing system to: determine at least one of a time limit or a distance limit for performing the computation using the sensor data; and determine, also based on at least one of the time limit or the distance limit, that the performance of the computation using the sensor data is to be offloaded to the remote computing system.

In some implementations, the one or more processors are further configured to perform operations to cause the computing system to: determine a signal strength of the communication network; and determine, also based on the signal strength, that the performance of the computation using the sensor data is to be offloaded to the remote computing system.

In some implementations, the one or more processors are further configured to perform operations to cause the computing system to: determine a quality of the sensor data; and determine, also based on the quality of the sensor data, that the performance of the computation using the sensor data is to be offloaded to the remote computing system.

In some implementations, outputting the sensor data payload to the remote computing system includes outputting the sensor data payload to an intermediate computing system.

In some implementations, the processed data payload is based on sensor data acquired by one or more other vehicles.

In some implementations, the sensor data payload includes one or more text strings indicative of the sensor data.

In some implementations, to determine that the performance of the computation using the sensor data is to be offloaded to the remote computing system, the one or more processors are configured to perform operations to cause the computing system to: determine an energy efficiency associated with offloading the computation to the remote computing system, the energy efficiency indicating an estimated energy savings of the one or more batteries of the vehicle by offloading the computation to the remote computing system.

One example aspect of the present disclosure is directed to a computer-implemented method. The method includes obtaining sensor data associated with the vehicle. The method includes determining an estimated energy usage for performing a computation onboard the vehicle using the sensor data, wherein the estimated energy usage is indicative of an estimated amount of energy from one or more batteries of the vehicle for performing the computation using the sensor data. The method includes, based on the estimated energy usage, determining that performance of the computation using the sensor data is to be offloaded to a remote computing system that is remote from the vehicle. The method includes, in response to determining that the computation using the sensor data is to be offloaded to the remote computing system, generating a sensor data payload indicative of the sensor data. The method includes outputting, over a communication network, the sensor data payload to the remote computing system.

In some implementations, the method includes obtaining, from the remote computing system, a processed data payload generated by the remote computing system performing the computation using the sensor data payload; and performing a vehicle function based on the processed data payload.

In some implementations, the method includes determining a time duration for performing the computation onboard the vehicle using the sensor data, and determining that the performance of the computation using the sensor data is to be offloaded to the remote computing system includes determining that the performance of the computation using the sensor data is to be offloaded to the remote computing system also based on the time duration.

In some implementations, the method includes determining at least one of a time limit or a distance limit for performing the computation using the sensor data; and determining that the performance of the computation using the sensor data is to be offloaded to the remote computing system includes determining that the performance of the computation using the sensor data is to be offloaded to the remote computing system also based on at least one of the time limit or the distance limit.

In some implementations, the method includes determining a signal strength of the communication network; and determining that the performance of the computation using the sensor data is to be offloaded to the remote computing system includes determining that the performance of the computation using the sensor data is to be offloaded to the remote computing system also based on the signal strength of the communication network.

In some implementations, the method includes determining a quality of the sensor data; and determining that the performance of the computation using the sensor data is to be offloaded to the remote computing system includes determining that the performance of the computation using the sensor data is to be offloaded to the remote computing system also based the quality of the sensor data.

In some implementations, the processed data payload is based on sensor data acquired by one or more other vehicles.

In some implementations, the sensor data payload includes one or more text strings indicative of the sensor data.

One example aspect of the present disclosure is directed to one or more non-transitory computer-readable media that store instructions that are executable by one or more processors of a control circuit to: obtain sensor data associated with the vehicle; determine an estimated energy usage for performing a computation onboard the vehicle using the sensor data, wherein the estimated energy usage is indicative of an estimated amount of energy from one or more batteries of the vehicle for performing the computation using the sensor data; based on the estimated energy usage, determine that performance of the computation using the sensor data is to be offloaded to a remote computing system that is remote from the vehicle; in response to determining that the computation using the sensor data is to be offloaded to the remote computing system, generate a sensor data payload indicative of the sensor data; and output, over a communication network, the sensor data payload to the remote computing system.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIGS. 9-11 illustrates flowchart diagrams of example methods according to an embodiment hereof.

DETAILED DESCRIPTION

Figure 1:
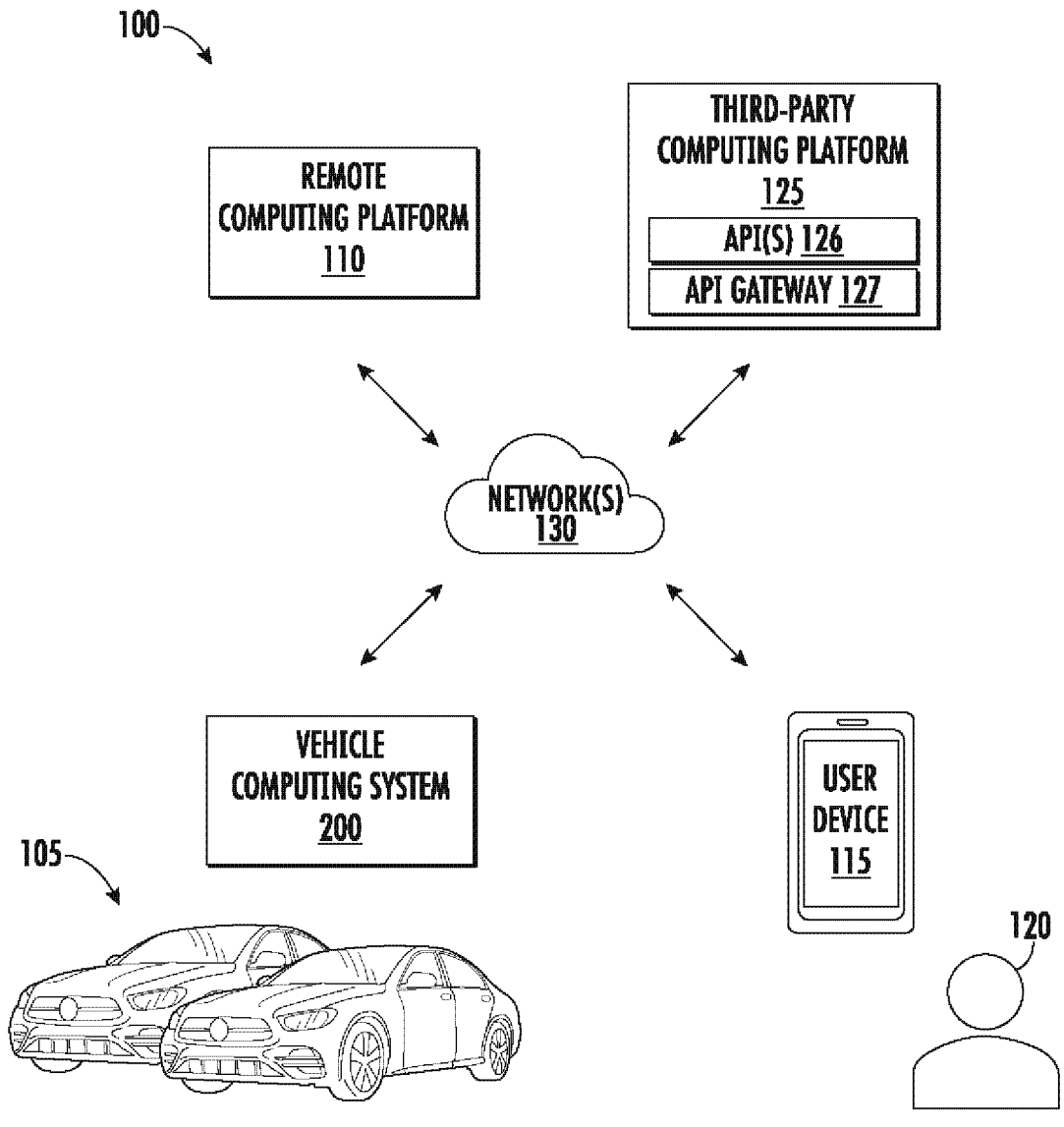
FIG. 1 illustrates an example computing ecosystem according to an embodiment hereof.

An aspect of the present disclosure relates to computing systems and computer-implemented methods for intelligently allocating computations across a distributed computing ecosystem that includes an electric vehicle. For instance, an electric vehicle may be a fully electric or hybrid electric vehicle that includes one or more batteries onboard the vehicle. The batteries may be utilized for propulsion (e.g., via an e-powertrain) as well as to provide power for performing computations via the processors onboard the vehicle.

Certain computations can be power-intensive, requiring more power from the vehicle's batteries. For example, autonomous vehicle computing power can significantly drain battery capacity based on current autonomous level 3 usage, drastically reducing the range of vehicles and limiting consumer usage.

The technology of the present disclosure helps to improve the efficiency of the vehicle's battery usage by intelligently leveraging remote computing resources for select computations. For example, a vehicle (e.g., a hybrid-electric, autonomous vehicle) may be performing autonomy functions related to environment perception, prediction, and motion planning to help it provide autonomous navigation. These functions can be based on sensor data collected by the vehicle. In some scenarios, these computations may be performed by a remote computing system that supports the vehicle. This may include stretches of road where there is little or no traffic.

To help determine whether to offload a computation to a remote computing system or to perform it onboard, the vehicle (e.g., its onboard "vehicle computing system") may utilize an algorithm that analyzes a variety of parameters associated with the vehicle. For instance, the vehicle may analyze a data connectivity signal strength, sensor data quality, time/distance constraints, and potential energy usage associated with offloading a computation to a remote computing system. In an example, the potential energy usage indicates the amount of onboard battery power that would be saved by offloading the computation to the remote computing system. Moreover, for hybrid-electric vehicles, the energy savings may represent a reduction in combustible fuel consumption or greenhouse gas emissions that may arise from offloading the computation (and saving vehicle battery power).

The algorithm can weigh the various parameters and determine that it would be beneficial to offload a computation to the remote computing system. By way of example, if the signal strength is strong enough for high computational scenarios, the data quality is sufficient, the time/distance constraints permissible, and the potential energy savings significant, the vehicle computing system may re-route collected vehicle sensor data required for the computation to the remote computing system (e.g., a cloud-based system).

The data collected from the vehicle may be sent to the remote computing system as raw data for processing. In some implementations, the remote computing system can perform the computations using fleet-level data that includes sensor data from one or more other vehicles. This may provide the remote computing system with an additional point-of-view for the vehicle's operating environment. The remote computing system may be configured to perform complex computations and pass return values to the vehicle via its data connection with the vehicle.

The vehicle computing system may process the return values and provide signals to instruct the vehicle to perform functions based on the results. This can include, for example, updating the vehicle's route, turning, yielding, issuing warning notifications, etc. Additionally, or alternatively, the return values may be fed directly into a particular vehicle system for an expected result from the vehicle (e.g. turning, accelerating, braking, etc.).

In some implementations, the return data sent from the remote computing system may be partial elements that are lower risk for the computation, so that less computational power is required onboard.

The technology of the present disclosure provides a number of technical effects and benefits. For instance, by offloading certain computations to a remote computing system, a vehicle can significantly reduce the amount of energy used for onboard computations, allowing the vehicle to re-allocate its battery power for other purposes-such as vehicle propulsion. For hybrid electric vehicles, this reduces the amount of greenhouse gas emissions produced directly from the vehicle, by allowing the saved battery power to be utilized for propulsion, rather than using its combustible fuel. For fully electric vehicles, this technology reduces the frequency/duration of charging that is needed at a charging station, which may draw its energy reserves from power plants that produce greenhouse gas emissions. Thus, reduced charging needs afforded by the present technology can lead to reduced greenhouse gas emissions from these power plants as well.

Furthermore, by selectively determining which computations to perform onboard the vehicle and which computations to offload to a remote system, the vehicle can ensure that computations selected for offloading will be performed accurately, efficiently, and timely so as to maintain vehicle performance. As a result, more complex vehicle functions (e.g., autonomy functions, ADAS functions, AI-powered personalization functions) can still be performed at a high level, with greater energy efficiency.

The systems and methods of the present disclosure provide improvements to computing technology. This includes improvements in vehicle computing technology. For instance, a vehicle computing system may obtain sensor data associated with the vehicle. The vehicle computing system can determine an estimated energy usage for performing a computation onboard the vehicle using the sensor data. The estimated energy usage may be indicative of an estimated amount of energy from one or more batteries of the vehicle for performing the computation using the sensor data. Based on the estimated energy usage (and/or other parameters), the vehicle computing system may determine that performance of the computation using the sensor data is to be offloaded to a remote computing system that is remote from the vehicle. In response to determining that the computation using the sensor data is to be offloaded to the remote computing system, the vehicle computing system may generate a sensor data payload indicative of the sensor data. The vehicle computing system may output, over a communication network, the sensor data payload to the remote computing system. The vehicle computing system may obtain, from the remote computing system, a processed data payload generated by the remote computing system performing the computation using the sensor data payload, and perform a vehicle function based on the processed data payload.

In this way, the vehicle computing system is provided the computational flexibility to offload certain computations in the event doing so would be energy efficient and the computations can be successfully performed given the vehicle's circumstances (e.g., signal strength, data quality, time/distance constraints). As a result, the vehicle can be more efficient with its local battery resources, while also saving onboard computing resources (e.g., processing, memory, etc.). Ultimately, this can lead to longer life and improved health for the vehicle's computers and batteries, reducing the frequency of battery/computing component disposal.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle. In some implementations, the user 120 may be a passenger of the vehicle. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. The computing platform 110 may host or otherwise include one or more APIs for communicating data to/from a computing system 130 of the vehicle 105 or the user device 115.

The computing platform 110 may include one or more computing devices. For instance, the computing platform 110 may include a control circuit and a non-transitory computer-readable medium (e.g., memory). A control circuit may be one or more processors. The control circuit of the computing platform 110 may be configured to perform the various operations and functions described herein. Further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services.

The third-party computing platform 125 may host or otherwise include one or more APIs 126 for communicating data to/from the third-party computing platform 125 to other systems/devices of the ecosystem 100. The APIs 126 allow an application running on the remote computing platform 110 or the user device 115 to communicate with the third-party computing platform 125 (e.g., its services). This can include monolithic or microservices based applications. The APIs 126 may define how these system request services from the third-party computing platform 125, and expose data within different contexts and across multiple channels.

The APIs 126 may be accessed via one or more API gateways 127. The API gateways 127 may be the infrastructure between the client systems (e.g., the remote computing platform 110, user device 115) and the services of the third-party computing platform 125 and may provide centralized handling of API communication between them. In some implementations, the API gateways 127 may provide security, policy enforcement, monitoring, and visibility across various environments.

In an example, the API gateways 127 may include a first API gateway and a second API gateway. The first API gateway may be utilized for communication from a mobile device such as, for example, the user device 115. The second API gateway may be utilized for communication from a server-based system such as, for example, the remote computing platform 110. The distinct API gateways 127 can allow for customization of API calls and responses, based on the type of requesting device, its bandwidth, etc.

The APIs 126 may allow another system to submit a request (e.g., via an API call) to a service of the third-party computing platform 125. This may include a request for certain information. In an example, the remote computing platform 110 may submit an API request for today's weather forecast from the third-party computing platform 125.

Additionally, or alternatively, a client system may utilize the APIs 126 to submit a request for a service to perform a task. In an example, this may include a request from the remote computing platform 110 or the user device 115 for the third-party computing platform 125 (e.g., one of its services) to perform a computation associated with the vehicle 105. As further described herein, this may allow the remote computing system 110 or the user device 115 to leverage the computing resources of the third-party computing platform 125, when a computation is offloaded from the vehicle computing system 200 to one or both of these systems.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a powertrain and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a powertrain of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle 105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel. The vehicle may also be configured to reference one or more protocols used for transmitting data (e.g., software updates) over a charging cable, wirelessly, via short-range communication (e.g., NFC, Bluetooth®), etc.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the computing system 130, may act as an external buffer or repository for storing information. In such an example, the computing system 130 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 that is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
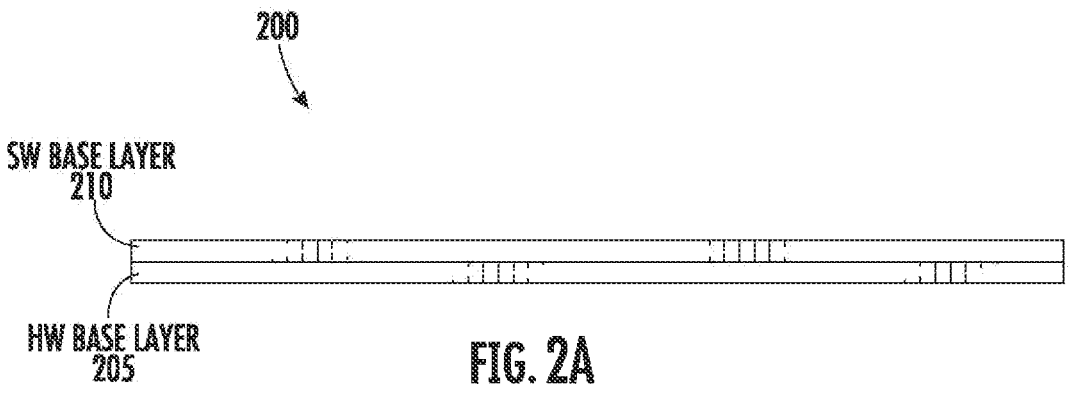
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
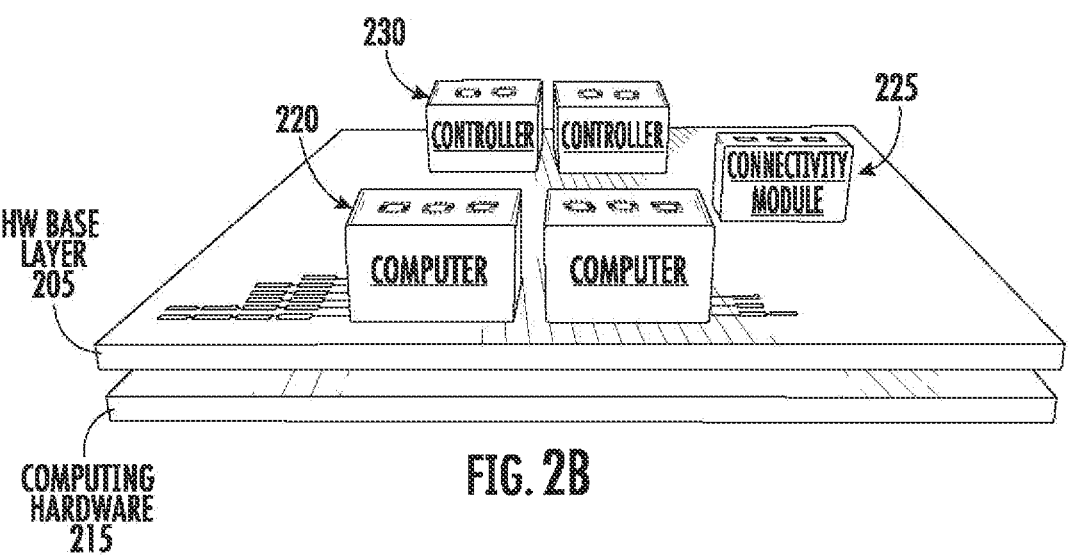

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality. The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 225. The vehicle control units 225 may be configured for controlling various functions of the vehicle 105. This may include, for example, a central exterior and interior controller (CEIC), a charging controller, or other controllers as further described herein.

Figure 2C:
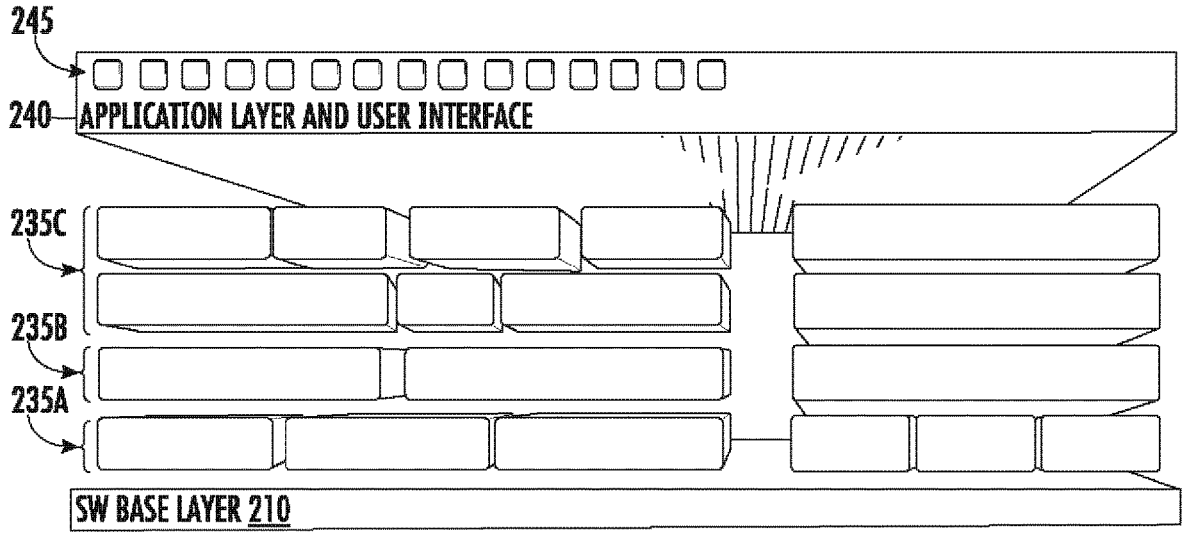

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using container interfaces to integrate with applications developed by a variety of different entities.

Figure 2D:
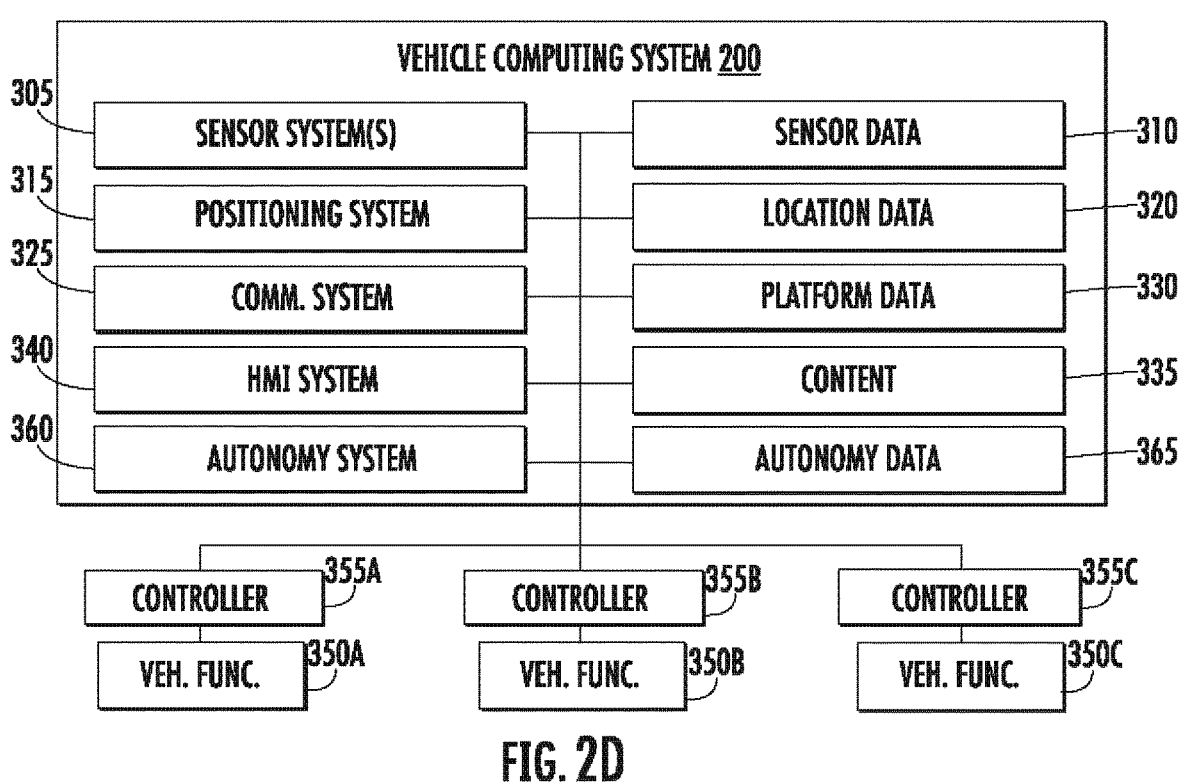

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may include other sensors configured to acquire data associated with the vehicle 105. For example, the vehicle 105 may include inertial measurement units, wheel odometry devices, or other sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, Wi-Fi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications system 325 configured to allow the vehicle 105 (and its vehicle computing system 200) to communicate with other computing devices. The vehicle computing system 200 may use the communications system 325 to communicate with the remote computing platform 110 or one or more other remote computing devices over a network 130 (e.g., via one or more wireless signal connections). For example, the vehicle computing system 200 may utilize the communications system 325 to receive platform data 330 from the computing platform 110. This may include, for example, an over-the-air (OTA) software update for the operating system of the vehicle computing system 200. Additionally, or alternatively, the vehicle computing system 200 may utilize the communications unit 325 to send vehicle data 335 to the computing platform 110. The vehicle data 335 may include any data acquired onboard the vehicle including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In some implementations, the communications system 325 may allow communication among one or more of the systems on-board the vehicle 105.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
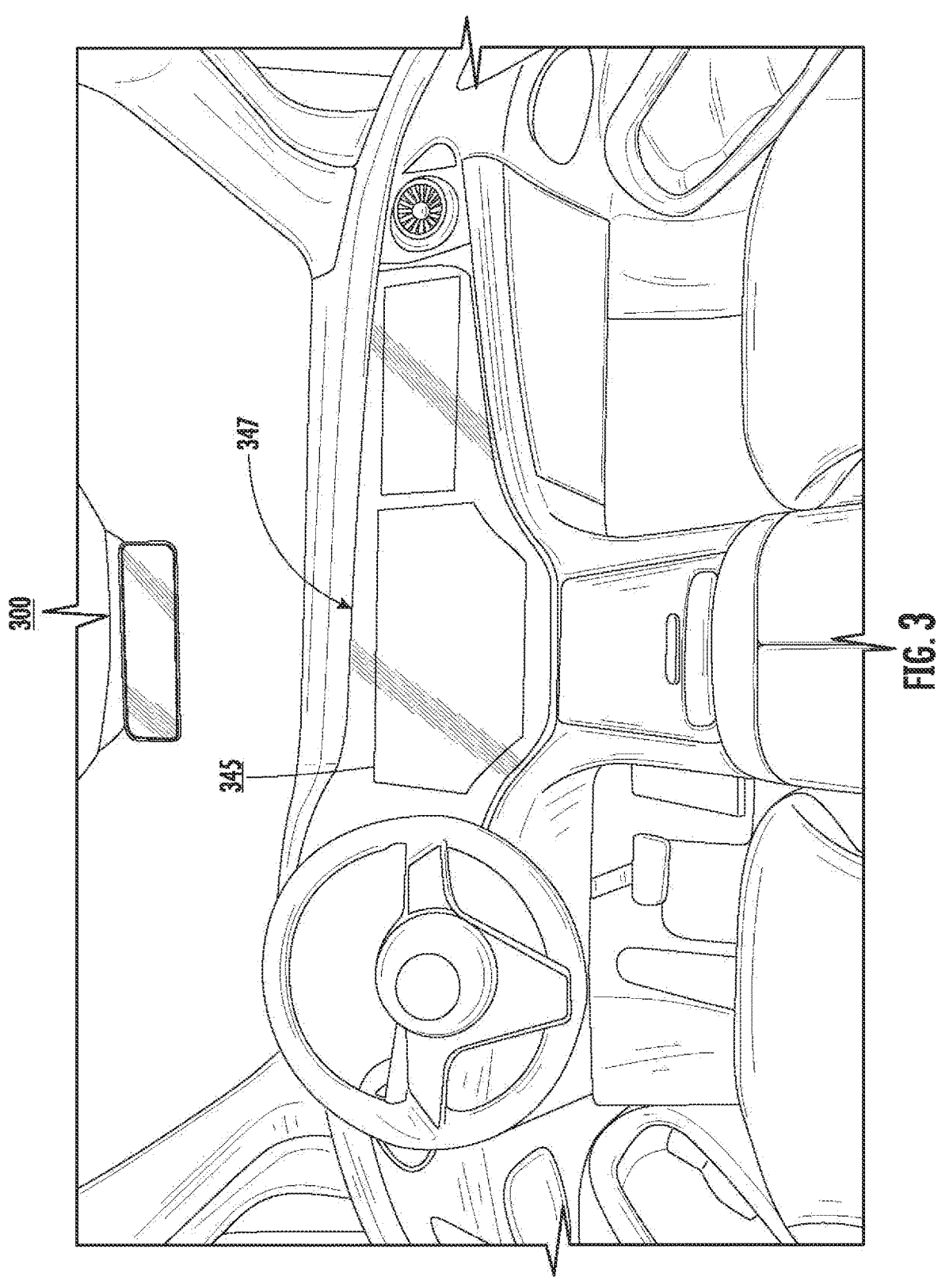
FIG. 3 illustrates a diagram of an example head unit of an example vehicle interior according to an embodiment hereof.

FIG. 3 illustrates an example vehicle interior 300 with a display device 345. The display device 345 may be a component of a head unit of the vehicle 105. The display device 345 may be a component of the vehicle's infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device 345 may include a touchscreen through which the user 120 may provide user input to a user interface.

For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data.

The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). Additionally, or alternatively, the display device 345 may be associated with an audio input device (e.g., microphone) for receiving audio input from the user 120.

Returning to FIG. 2D, the vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). Additionally, or alternatively, such data can be included in vehicle data 335 and transmitted to the computing platform 110.

In an embodiment, the vehicle computing system 200 may include an autonomy system 360. The vehicle 105 may be an autonomous vehicle that includes an autonomy system

360. The autonomy system 360 may allow the vehicle 105 to drive, navigate, operate, etc. with minimal and/or no interaction from a human driver. For example, the vehicle 105 may operate semi-autonomously with some interaction from a human driver present in the vehicle 105. The vehicle 105 may be configured to operate in a fully autonomous manner (e.g., self-driving manner) such that the vehicle 105 may drive, navigate, operate, etc. with no interaction from a human driver.

The autonomy system 108 may ingest the sensor data 310 and other data (e.g., map data, traffic data) to perform various autonomy functions for autonomously operating the vehicle 105. This may include perceiving the environment of the vehicle 105, predicting the motion of objects within the environment of the vehicle 105, and planning the motion of the vehicle 105.

While performing these functions, the autonomy system 108 may generate autonomy data 364. The autonomy data may include perception data, prediction data, motion planning data, or other types of data.

The autonomy system 360 may identify objects that are within the environment of the vehicle 105 based on the sensor data (and/or the map data). For example, the autonomy system 360 may obtain data descriptive of a current state of an object that is within the field of view of a sensor system 305 of the vehicle 105. The data for each object may describe, for example, an estimate of the object's: current location; current speed/velocity; current acceleration; current heading; current orientation; size/footprint (e.g., as represented by a bounding shape); object type (e.g., pedestrian, vehicle, bicycle), and/or other information. The autonomy system 360 may utilize this data to predict the movement of the perceived objects.

The autonomy system 360 may create prediction data associated with each of the respective objects detected by the autonomy system 360. The prediction data may be indicative of one or more predicted future locations of each respective object. The prediction data may be indicative of a predicted path an object within the surrounding environment of the vehicle 105 (e.g., autonomous vehicle). For example, the predicted path may indicate a path along which the respective object is predicted to travel over time (and/or the speed at which the object is predicted to travel along the predicted path). The autonomy system 360 may utilize the prediction data associated with the objects to plan the motion of the vehicle 105.

The autonomy system 360 may determine a motion plan for the vehicle 105 based on the prediction data. The motion plan may include vehicle actions with respect the objects within the environment of the vehicle 105 as well as their predicted movements. For instance, the autonomy system 360 may implement an optimization algorithm that considers cost data associated with a vehicle action as well as other cost functions (e.g., based on speed limits, traffic lights, etc.), if any, to determine optimized variables that make up the motion plan. By way of example, the autonomy system 360 may determine that the vehicle 105 may perform a certain action (e.g., pass an object) without increasing the potential risk to the vehicle 102 and/or violating any traffic laws (e.g., speed limits, lane boundaries, signage). The motion plan may include a planned trajectory, speed, acceleration, etc. of the vehicle 105.

The autonomy system 360 may provide the motion plan indicative of the vehicle actions, a planned trajectory, and/or other operating parameters to the controllers 355A-C (or an interface thereof) to implement the motion plan for the vehicle 105. For instance, the vehicle 105 can include a controller configured to translate the motion plan into instructions. By way of example, the controller may translate a determined motion plan into instructions to adjust the steering of the vehicle 105, apply a certain braking force, etc. The mobility controller may send one or more control signals to the controllers 355A-C to execute the instructions and implement the motion plan.

Figure 4:
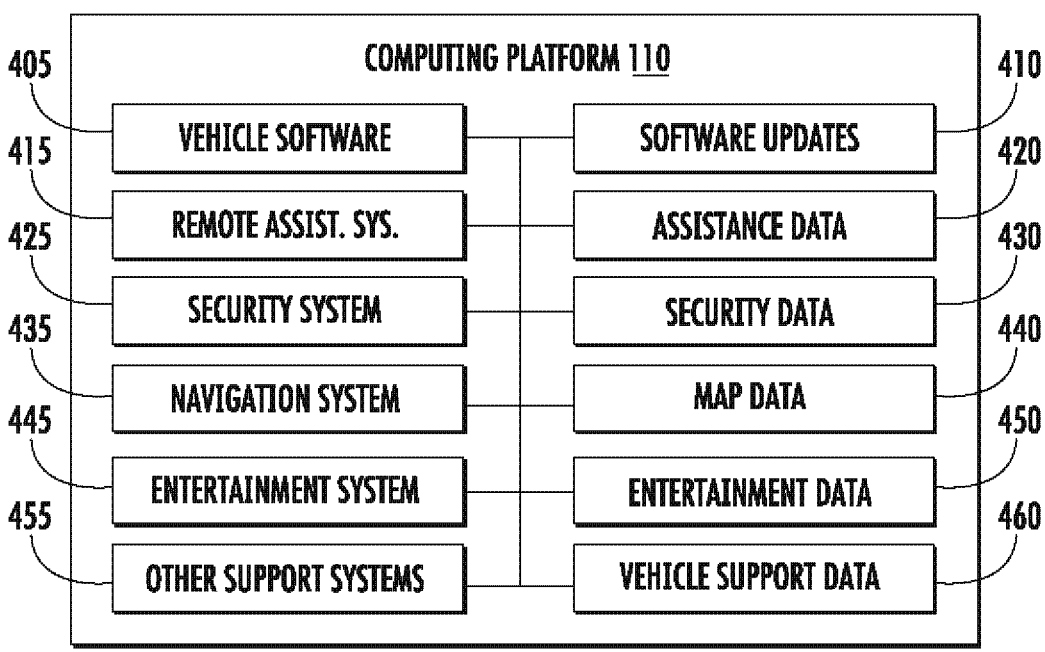
FIG. 4 illustrates a diagram of a computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform. The computing platform 110 may be implemented on one or more servers and include, or otherwise have access to, one or more databases. In an example, the computing platform 110 may be implemented using different servers based on geographic region.

In some implementations, the computing platform 110 may include layered infrastructure that includes a plurality of layers. For instance, the computing platform 110 may include a cloud-based layer associated with functions such as security, automation, monitoring, and resource management. The computing platform 110 may include a cloud application platform layer associated with functions such as charging station functions, live traffic, vehicle functions, vehicle-sharing functions, etc. The computing platform 110 may include applications and services that are built on these layers.

The computing platform 110 may be a modular connected service platform that includes a plurality of services that are available to the vehicle 105. In an example, the computing platform 110 may include a container-based micro-services mesh platform. The services can be represented or implemented as systems within the computing platform 110. The computing platform 110 may also include functions relating to simulation of its components, services, and subsystems. As further described herein, this may be accomplished through the use of a test computing system that is a part of (or at least in communication with) the computing platform 110.

The computing platform 110 may include a user system 405. The user system 405 may create, store, manage, or access user profile data 410. The user profile data 410 may include a plurality of user profiles, each associated with a respective user 120. A user profile may indicate various information about a respective user 120 including the user's preferences (e.g., for music, comfort settings), frequented/past destinations, past routes, etc. The user profiles may be stored in a secure database. In some implementations, when a user 120 enters the vehicle 120, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 410 to the vehicle computing system 200 of the vehicle 105. The vehicle computing system 200 may utilize the user profile data 410 to implement preferences of the user 120, present past destination locations, etc. The user profile data 410 may be updated based on information periodically provided by the vehicle 105. In some implementations, the user profile data 410 may be provided to the user device 120.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 1110 or the vehicle 105. For instance, the security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data.

Data provided by the navigation system 435 can be presented as content on the display device 345 of the vehicle 105, shown in FIG. 3.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system (e.g., via an API) associated with a third-party service provider of entertainment content. The entertainment data 450 may include media content such as music, videos, gaming data, etc. The vehicle 105 may output the entertainment data 450 via one or more output devices of the vehicle 105 (e.g., display device, speaker, etc.).

The computing platform 110 may include other support systems 455 configured to provide back-end support services for the vehicle 105. For instance, the other support system 455 may include an autonomy support service. The autonomy support service may be configured to perform computations similar to the autonomy functions performed onboard the vehicle 105. In an example, the autonomy support service may include the models, algorithm, software code, etc. similar to those downloaded and running in the vehicle's onboard autonomy system 360. This may allow the computing platform 110 to perform functions similar to the autonomy system 360 to assist the autonomous operation of the vehicle 105, if needed.

In some implementation, the other support systems 455 may include an ADAS support service. The ADAS support service may include the models, algorithm, software code, etc. similar to those downloaded and running onboard the vehicle 105 that allow the vehicle 105 to implement the vehicle's ADAS functions.

In some implementations, the other support systems 455 may include a user personalization service. The user personalization service may include models, algorithms, software code, data models, etc. that allow for personalization of the vehicle's feature for the respective user 120 (e.g., driver) of the vehicle 105. This may include storing a data model that indicates the preferences of a particular user 120 (e.g., music, internal temperature, seat massage, window position, etc.) given the particular time of day, weather conditions, traffic conditions, etc. The vehicle 105 can access the data model to automatically adjust the onboard features/components to align with the user's preferences.

In some implementations, the other support systems 466 may include a software update service that is configured to provide the vehicle 105 with one or more software updates. For example, the software update service may maintain or otherwise access a data structure (e.g., list, table) that indicates the current software or versions thereof downloaded to a particular vehicle. The software update service may also maintain a data structure indicating software packages or versions that are to be downloaded by the particular vehicle. In some implementations, the vehicle computing system 200 may maintain a data structure that indicates the computing hardware, charging hardware, or other hardware resources onboard a particular vehicle. These data structures can be organized by vehicle identifier (e.g., VIN) such that the computing platform 110 can perform a look-up function, based on the vehicle identifier, to determine the associated software (and updates) for a particular vehicle.

When the vehicle 105 is connected to the computing platform 110 and is available to update its software, the vehicle 105 can request a software package such as, for example, a software update from the computing platform. The computing platform 110 can provide the vehicle 105 one or more software updates as over-the-air (OTA) software packages (also referred to as "OTA software updates" or "OTA updates") via a network 130. The OTA software packages (OTA updates) may include new versions of software currently downloaded to the vehicle or new software applications to be downloaded to the vehicle.

Figure 5:
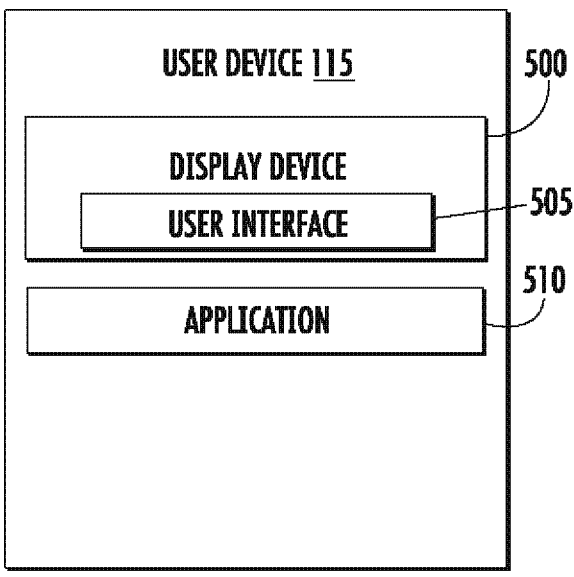
FIG. 5 illustrates a diagram of an example user device according to an embodiment hereof.

FIG. 5 illustrates a diagram of example components of user device 115 according to an embodiment hereof. The user device 115 may include a display device 500 configured to render content via a user interface 505 for presentation to a user 120. The display device 500 may include a display screen, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

The user device 115 may be configured to pair with the vehicle 105 via a short-range wireless protocol. The short-range wireless protocol may include, for example, at least one of Bluetooth®, Wi-Fi, ZigBee, UWB, IR. The user device 115 may pair with the vehicle 105 through one or more known pairing techniques. For example, the user device 115 and the vehicle 105 may exchange information (e.g., addresses, device names, profiles) and store such information in their respective memories. Pairing may include an authentication process whereby the user 120 validates the connection between the user device 115 and the vehicle 105.

Once paired, the vehicle 105 and the user device 115 may exchange signals, data, etc. through the established communication channel. For example, the head unit 347 of the vehicle 105 may exchange signals with the user device 115.

The technology of the present disclosure allows a vehicle 105 to utilize a remote computing system to perform certain functions for the vehicle 105. To do so, the vehicle 105 can include a computing system that is configured to reduce the energy consumed from the vehicle's batteries by intelligently selecting computations to be performed offboard the vehicle 105. As described herein, this can improve the energy efficiency for an electric vehicle and decrease the fuel consumption for hybrid electric vehicles, thereby reducing its greenhouse gas emissions.

Figure 6:
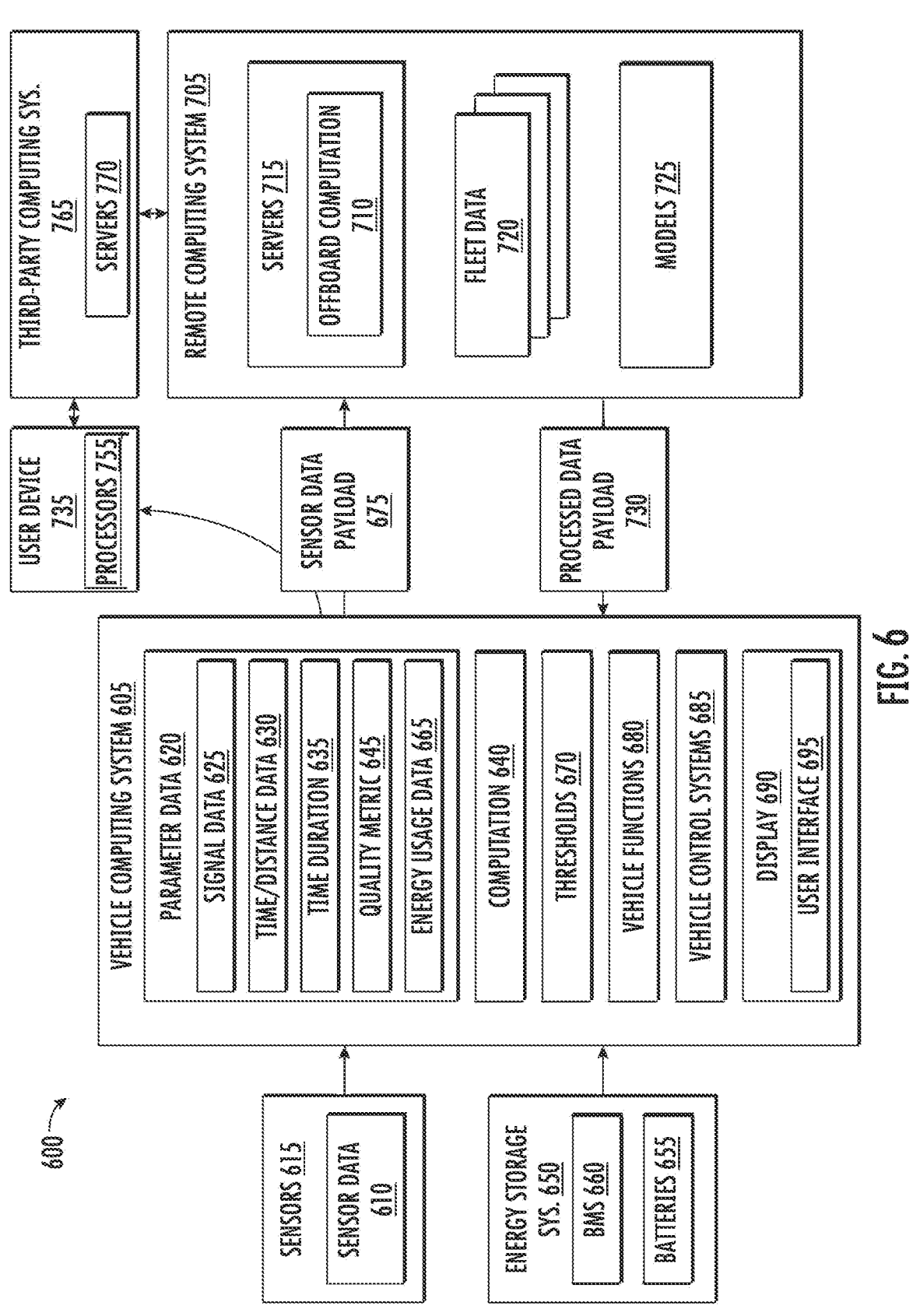
FIG. 6 illustrates a diagram of an example computing ecosystem and dataflow for distributing computing tasks according to an embodiment hereof.

FIG. 6 illustrates a diagram of example computing ecosystem 600 and dataflow for distributing computing tasks according to an embodiment hereof. The computing ecosystem 600 may include a vehicle computing system 605 and a remote computing system 610. The components, systems, and subsystems of FIG. 6 may be implemented as modules on computing hardware.

The remote computing system 705 may be, be a portion of, or otherwise include the computing platform 110.

The vehicle computing system 605 may be located onboard a vehicle. For example, the vehicle computing 605 may be, be a portion of, or include vehicle computing system 200 and be located onboard vehicle 105. The vehicle computing system 605 may include a control circuit that includes one or more processors configured to perform operations such as those described herein. In some implementations, the vehicle containing the vehicle computing system 605 may be an autonomous vehicle and the vehicle computing system 605 may include an autonomy system 360.

The vehicle computing system 605 may obtain sensor data 610 associated with a vehicle. The sensor data 610 may be acquired via one or more sensors 615 of the vehicle. The sensors 615 may include a Light Detection and Ranging (LIDAR) system, a Radio Detection and Ranging (RADAR) system, one or more cameras (e.g., visible spectrum cameras, infrared cameras, etc.), motion sensors, weight sensors, and/or other types of imaging capture devices and/or sensors. The sensor data 610 may include image data, radar data, LIDAR data, and/or other data acquired by the sensors 615.

Figure 7:
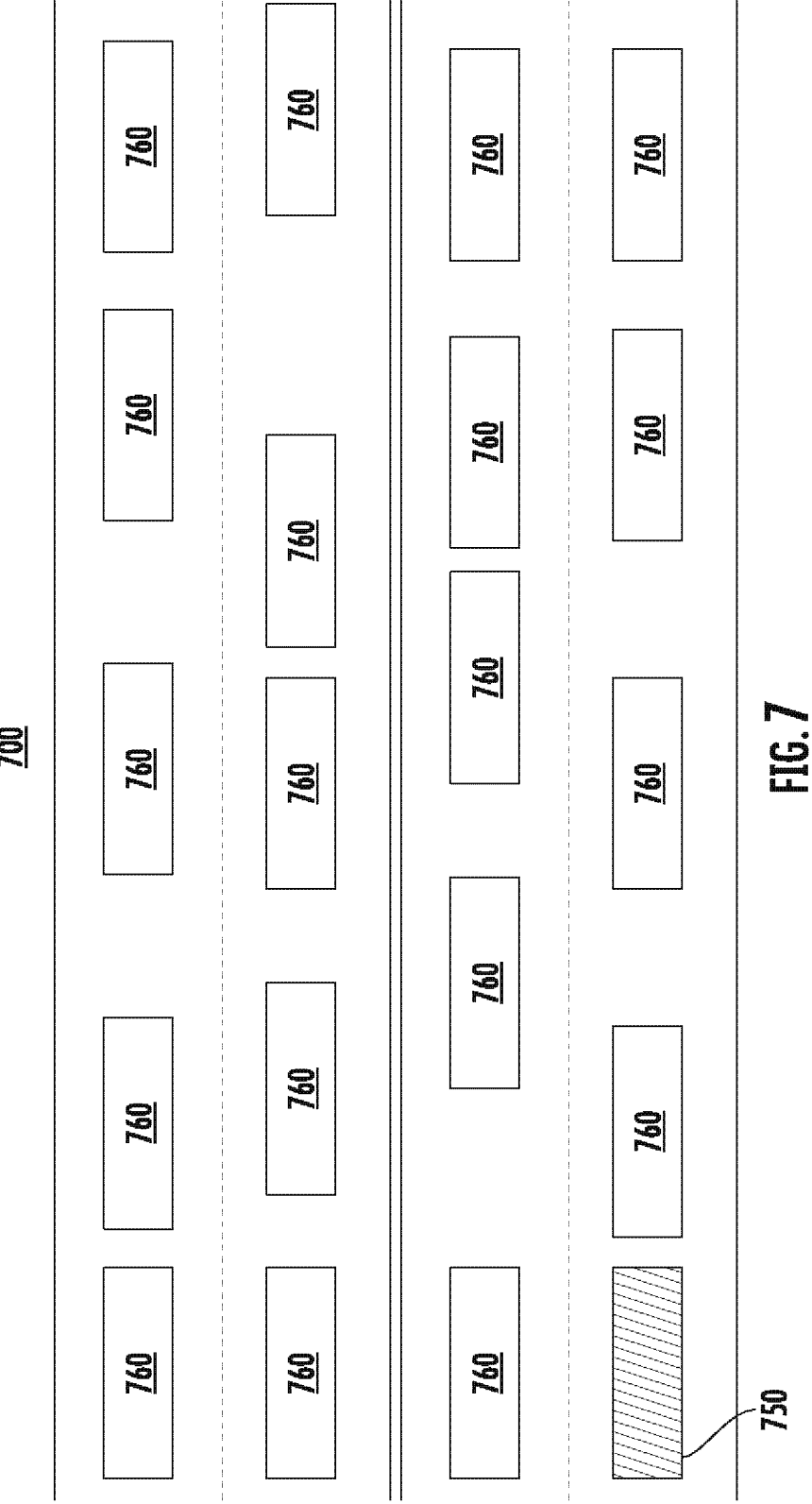
FIG. 7 illustrates a diagram of an example roadway with vehicles according to an embodiment hereof.

The sensor data 605 may include data indicative of the environment of the vehicle. This can include data indicative of the objects surrounding the vehicle. By way of example, with reference to FIG. 7, the vehicle 750 may be travelling along a roadway. The vehicle 750 (e.g., an autonomous vehicle) may have a plurality of objects 760 within the vehicle's surrounding environment. The objects 760 may include, for example, other vehicles that are in traffic on the roadway. The sensor data 610 may include camera images of at least some of these other vehicles 610.

Returning to FIG. 6, the sensor data 610 may include data from one or more other systems within the environment of the vehicle and within communication range. This may include data provided from other vehicles via vehicle-to-vehicle communication or from infrastructure via vehicle-to-infrastructure communication.

The sensor data 610 may be obtained while the vehicle is travelling or otherwise on a roadway. For example, the vehicle may be driving autonomously and the sensors 615 may be local hardware sensors (onboard the vehicle) that are collecting sensor data 610 for the vehicle in a low-bandwidth transmissible form (e.g. text, symbolic tokens for specific sensor scenarios, etc.).

The vehicle computing system 605 may be configured to perform various computations based on the sensor data 610. This may include computations to support the autonomy functions described herein such as object perception, object movement prediction, and motion planning. In some implementations, this can include computations associated with ADAS functions such as lane changing recommendations, warning notifications, automated steering corrections (e.g., to maintain lane position), automated braking, etc.

In some implementations, the computations can be associated with vehicle functions related to user personalization. For example, the vehicle computing system 605 can process the sensor data 610 to determine whether certain conditions exist for activating comfort features of the vehicle. This can include, for example, detecting changes in temperature, humidity, precipitation, or the like and adjusting the interior temperature of the vehicle, adjusting the position of the vehicle's windows, seat heater, etc.

The vehicle computing system 605 may be configured to determine which computations to perform onboard the vehicle and which computations to offload to the remote computing system 705 to preserve energy from the vehicle's batteries. To do so, the vehicle computing system may analyze a number of parameters stored as parameter data 620.

The vehicle computing system 605 may obtain signal data 625. The signal data 625 may be indicative of a signal strength of the communication network. The signal strength can be indicative of the strength of the network connectivity associated with the vehicle. The signal strength can be measured, for example, in dBm. In some implementations, the signal strength can be expressed in relative terms such as zero, low, medium, high level. The signal strength can be indicative of the current connectivity of the vehicle or the estimated/predicted signal strength at a future location (e.g., along the vehicle's route).

The vehicle computing system 605 may determine at least one of a time limit or a distance limit for performing a computation using the sensor data 610. This information may be stored as time/distance data 630. The time limit and distance limit for performing the computation using the sensor data 610 may be based on map data associated with the geographic area in which the vehicle is traveling.

Figure 8:
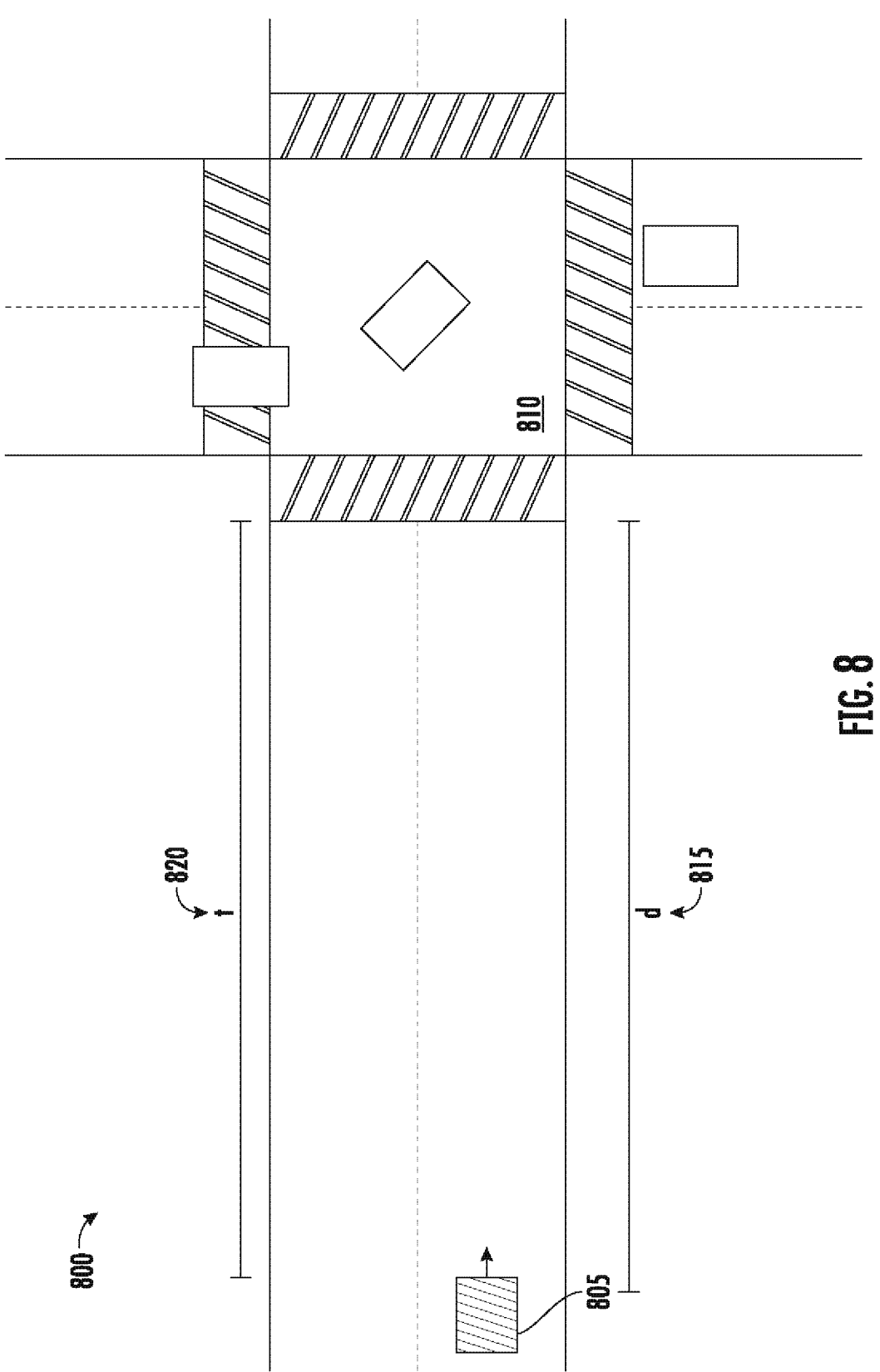
FIG. 8 illustrates a diagram of an example roadway with an intersection and vehicles according to an embodiment hereof.

For example, FIG. 8 illustrates a diagram of an environment 800 in which a vehicle 805 is operating. The environment 800 includes an intersection 810. The map data may be indicative of the intersection 810. For example, the map data may indicate the latitude and longitude coordinates of the intersection (e.g., the closest point to the travel lane of the vehicle). The vehicle computing system 605 may process the map data to determine that the vehicle 805 is a certain distance (d) 815 away from the intersection 810 and/or a certain time (t) 820 from arriving at the intersection 810 (e.g., given the vehicle's current speed). For example, the vehicle computing system 605 may obtain data indicative of the current location of the vehicle 805 (e.g., GPS data) and compute a difference between the current location of the vehicle 805 and the location of the intersection 810. The certain distance (d) 815 between the current location of the vehicle 805 and the location of the intersection 810 may be the computed difference between these locations. The certain time (t) 820 can be computed based on the certain distance (d) 815 divided by the current speed of the vehicle 805.

The certain distance (d) 815 and the certain time (t) 810 may indicate the physical distance and time requirement for the vehicle 805 to complete a computation. The certain distance (d) 815 may indicate a distance limit for performing a computation using the sensor data 610. Additionally, or alternatively, the certain time (t) 820 can indicate a time limit for performing the computation using the sensor data 610.

These limits indicate the future point in time or the future location of the vehicle (after traveling the certain distance) by which a computation by the vehicle is to be completed. For example, a complex re-routing action or motion planning function associated with the intersection (e.g., that will cause the vehicle 805 to veer from a path or turn left) will need to be completed by the time the vehicle 805 reaches the intersection 810. Thus, the vehicle 805 has the certain time (t) 820 and/or certain distance (d) 815 within which to complete the computation.

Returning to FIG. 6, the vehicle computing system 605 may determine a time duration 635 for performing a computation 640 onboard the vehicle using the sensor data 610. The time duration 635 may be indicative of the amount of time needed for completing the computation 640. For example, the vehicle computing system 605 may include a data store that includes historical data indicative of past computations. The historical data can indicate the type of computation, the computing resources previously used to complete the computation (e.g., the hardware and processing used), and the amount of time used to complete the computation.

The vehicle computing system 605 can access the historical data based on the type of the computation 640 and predict the time duration for completing the computation 640 based on the time durations previously needed to complete similar previous computations (e.g., associated with re-routing, motion planning, ADAS functions, personalization functions).

The vehicle computing system 605 may determine a quality metric 645 for the sensor data 610. The quality metric 645 can be indicative of a quality of the sensor data 610. The quality can be indicative of an error associated with the data, a confidence, an accuracy, a consistency, a validity, an integrity, a completeness, etc. In an example, LIDAR data sets that include sparser returns may be lower in quality than LIDAR data sets with denser return signals. In another example, image data (e.g., from onboard cameras) that includes significant occlusion in the image frames can be considered lower quality than image data that includes zero or a limited number of occlusions.

The vehicle computing system 605 may determine an estimated energy usage for performing a computation 640 onboard the vehicle using the sensor data 610. The estimated energy usage may be indicative of an estimated amount of energy from one or more batteries of the vehicle for performing the computation 640 using the sensor data 610. The estimated energy usage can be expressed in terms of energy consumption (e.g., kWh). This information may be stored as energy usage data 665.

To do so, the vehicle computing system 605 may obtain data associated with the vehicle's batteries. For example, the vehicle can include an energy storage system 650. The energy storage system 650 can include one or more batteries 655. The energy from the batteries 655 may be used for the electric power train of the vehicle (e.g., an electric vehicle) and for the computing functions performed onboard the vehicle.

The energy storage system 650 may include a battery management system (BMS) 660 that manages the batteries 655. The BMS 660 may provide data indicative of the state of health (SoH), state of charge (SoC), efficiency, or other parameters of the batteries 655. This type of information can be tracked and maintained by the BMS 660 and provided to the vehicle computing system 605 from the energy storage system 650.

The vehicle computing system 605 may compute the estimated energy usage for performing the computation 640 onboard the vehicle based on the historical data and the data associated with the batteries 655 of the vehicle. For example, the vehicle computing system 605 may access the historical data (from the datastore) to determine the computing resources previously utilized for a certain computation 640 (e.g., the vehicle re-routing, motion planning, ADAS function). The vehicle computing system 605 may determine the size and complexity of the sensor data 610. Based on the sensor data 610 (and the historical data associated with previous like computations), the vehicle computing system 605 can determine the estimated energy usage 665 by predicting the amount of energy that the vehicle will utilize over the time duration 635 needed to complete the computation 640 using the vehicle's processors.

The vehicle computing system 605 can determine whether the computation 640 should be performed onboard the vehicle or offloaded to a remote computing system 705. The vehicle computing system 605 may make this determination by using one or more thresholds 670. The thresholds 670 may indicate of a threshold level of a parameter that is required for the vehicle to offload the computation 640 to the remote computing system 705.

For example, the thresholds 670 may include a signal strength threshold. The signal strength threshold may indicate the minimum level of signal strength needed for the vehicle to transmit a communication to the remote computing system 705 over a network. An onboard algorithm may be used to detect a minimum signal threshold (e.g. signal strength) that will be a defined minimum percentage (e.g. 95%), whereby the vehicle computing system 605 may continuously enable or disable a transmission module based on signal availability. In the event that the signal strength is below the signal strength threshold, the network connectivity may be too weak for a communication to be transmitted to the remote computing 705.

Based on the signal strength, the vehicle computing system can determine that the computation 640 is to be performed onboard the vehicle or offloaded to the remote computing system. In the event that the signal strength is below the signal strength threshold, the vehicle computing system 605 may determine that the computation 640 may not be offloaded to the remote computing system 705 because data transmission for doing so would not reach the remote computing system 705 over the network (in time). By way of example, based on the signal strength and capacity, data transmission for autonomous driving can be sent on a zero, low, mid or high level capacity for computations instead of using the local onboard computer to calculate the autonomous driving calculations. Based on the level, this may have a direct correlation to the onboard computation power required, which can translate to the total amount of energy saved.

Additionally, or alternatively, the thresholds 670 can include a sensor quality threshold. The sensor quality threshold may indicate the minimum quality level of the sensor data 610 that is needed for the computation to be performed offboard the vehicle. The vehicle computing system 605 can determine, based on the quality of the sensor data (e.g., as compared to the threshold), that the performance of the computation 640 using the sensor data is to be offloaded to the remote computing system 705 or performed onboard the vehicle. For example, if the quality metric 645 indicates that the sensor data 610 is usable, the vehicle computing system 605 may determine that the sensor data 610 may be transmitted to a remote computing system 705, for computation. However, if the sensor data quality is insufficient (e.g., below the quality threshold because the data is too sparse), the vehicle computing system 605 can determine that the sensor data 610 is not to be transmitted offboard the vehicle for performing the desired computation.

The vehicle computing system 605 can determine, based on at least one of the time limit or the distance limit, that the performance of the computation using the sensor data is to be offloaded to the remote computing system (or performed onboard the vehicle). For example, the vehicle computing system 605 can aggregate the time duration 635 for performing the computation 640 (e.g., the autonomous vehicle re-routing) and the added time for offloading the computation to a remote computing system 705. The added time for offloading the computation 640 may include the time for transmitting data, the time for the remote computing system to complete the computation, and the time for the processed data to be transmitted back to the vehicle. The aggregated time can be compared to the time limit for performing the calculation. In the event the aggregated time is greater than the time limit, the vehicle computing system 605 may determine that the computation 640 (e.g., a motion planning related task) should be performed onboard the vehicle.

In some implementations, the time limit (or distance limit) for performing a computation 640 may be too low to offload the computation 640 to the remote computing system 705. For instance, in the event the vehicle is in dense traffic (e.g., as in FIG. 7), the vehicle computing system 605 may determine that a computation 640 may not be offloaded to the remote computing system 705. This may be determined to ensure that latency is not introduced where there are a plurality of objects within close proximity to the vehicle.

Additionally, or alternatively, the determination as to whether to perform the computation 640 onboard the vehicle or offboard the vehicle may be based on the energy usage data 665. For example, based on the estimated energy usage, the vehicle computing system 605 may determine that performance of the computation 640 using the sensor data 610 is to be executed onboard the vehicle. The estimated energy usage 665 may indicate that the battery energy consumed by the vehicle, in performing the computation 640 with its onboard resources, is low enough such that it would not be energy efficient to transmit the sensor data 610 over a communication network to the remote computing system 705. In another example, given a relatively short time limit for performing the computation, the vehicle computing system 605 may determine that it would be preferable to perform the computation 640 (e.g., autonomous vehicle re-routing through the intersection 810) onboard in the event the amount of energy saved by offloading the computation 640 would be minimal, such that the shorter timeframe outweighs the benefit of offloading.

In response to determining that the computation 640 using the sensor data 610 is to be performed onboard the vehicle, the vehicle computing system 605 may execute the computation 640 onboard the vehicle. This includes executing the computation 640 using the processors, models, algorithms, etc., of the vehicle computing system 605, onboard the vehicle.

Based on the estimated energy usage, the vehicle computing system 605 can determine that performance of the computation using the sensor data 610 is to be offloaded to the remote computing system 705 that is remote from the vehicle. For instance, the vehicle computing system 605 can compare the estimated energy usage for performing a computation 640 (e.g., for queuing changes for personalized comfort features) to an energy threshold. The vehicle computing system 605 can determine that the amount of energy that would be consumed via the onboard processing would be greater than the threshold energy amount.

The vehicle computing system 605 may determine an energy efficiency associated with offloading the computation to the remote computing system 705. The energy efficiency may indicate an estimated energy savings of the one or more batteries 655 of the vehicle by offloading the computation 640 to the remote computing system 705. The estimated energy savings can be the estimated energy usage minus the estimated amount of energy the vehicle computing system will consume transmitting the sensor data 610 to the remote computing system 705 and receiving/processing a response thereto. In the event that the estimated energy savings is above a savings threshold, the vehicle computing system 605 can determine that it would be more efficient to offload the computation 640 to the remote computing system 705 (e.g., if timing permits) rather than perform the computation 640 by the vehicle computation system 605.

In response to determining that the computation 640 using the sensor data 610 is to be offloaded to the remote computing system 705, the vehicle computing system 605 may generate a sensor data payload 675 indicative of the sensor data 610. The sensor data payload 675 can be a lightweight representation of the sensor data 610. For example, the sensor data payload 675 may include one or more text strings indicative of the sensor data 610. In some implementations, the sensor data payload 675 may include raw sensor data. In some implementations, the sensor data payload 675 may include snippets of sensor data 610. The sensor data payload 675 may include metadata. The metadata may include information such as a transmission timestamp, transmission location, vehicle identifier, sensor modality, sensor type, etc.

The vehicle computing system 605 may output, over a communication network, the sensor data payload 675 to the remote computing system 705. The sensor data payload 675 may be transmitted via a wireless communication protocol (e.g., SIM data network) to the remote computing system 705 (e.g., a cloud-based system). The sensor data payload 675 may be transmitted in one or more communications. The sensor data payload 675 may be transmitted in one or more different forms.

In some implementations, outputting the sensor data payload 675 to the remote computing system 705 may include outputting the sensor data payload 675 to an intermediate computing system. The intermediate computing system may include another computing system that is remote from the vehicle, such as another cloud-based computing system. In an example, transmitting the sensor data payload 675 may include using the connectivity with V2X objects, such as IoT devices (e.g. other vehicles, local LAN, etc.) which are connected to the internet. This can allow the vehicle to utilize the existing internet connection of other objects to achieve connectivity and transmit computations without the use of the vehicle's own individual signal.

In an example, outputting the sensor data payload 675 may include utilizing wireless connectivity (e.g. SIM/eSIM-enabled, WLAN, satellite, etc.) for an autonomous vehicle computation that preferably uses a resilient high level data connectivity. This may also include P2P vehicle signals, IoT signal transmission (e.g., V2X), or other intermediaries.

The remote computing system 705 may utilize the sensor data payload 675 to perform an offboard computation 710 with its servers 715. The offboard computation 710 may be the same as the onboard computation 640 that the vehicle computing system 605 would have performed onboard the vehicle, had the vehicle not offloaded the performance of the computation 640.

In some implementations, the offboard computation 710 may be a portion of the onboard computation 640. For instance, the vehicle computing system 605 may still execute a portion of the computation 640 onboard the vehicle and the remote computing system 705 may execute a partial computation. The partial computation may be the portion of the computation 640 that the vehicle computing system 605 does not perform onboard vehicle. Ultimately, the vehicle computing system 605 may combine the results of the portion of the computation 640 performed onboard the vehicle and the results of the partial computation 710 performed offboard the vehicle, to achieve a comprehensive result.

In an example, the servers 715 are more robust than the processing resources of the vehicle computing system 605. This allows the remote computing system 705 to run the offboard computation 710 using significantly more powerful computers that can handle high loads (e.g., across a fleet of vehicles). As these are upgradable, there are no vehicle dependencies, so the computing power for all connected vehicles may improve over time.

The remote computing system 705 may use fleet data 720 in performing the offboard computation 710. For instance, the remote computing system 705 may obtain sensor data payloads from a plurality of vehicles. The sensor data payloads from the other vehicles may provide a different point-of-view, different timestamp/time range, etc.

By way of example, in performing a complex re-routing or motion planning task for a first vehicle, the remote computing system 705 may obtain a sensor data payload from the first vehicle and fleet data 720 that includes sensor data payloads from other vehicles. The other vehicles may include those that are travelling in the opposite direction of the first vehicle. The sensor data from these other vehicles may have been captured at various positions along a roadway on which the first vehicle is travelling. Such data can indicate that there is an upcoming traffic jam in a particular lane of the roadway (e.g., an environment in which the first vehicle will travel). The sensor data payload from the first vehicle may indicate the first vehicle is currently traveling in that particular lane of the roadway. Using the fleet data 720 and the sensor data payload from the first vehicle, the remote computing system 705 may perform an offboard computation 710 to help plan the motion for the first vehicle to suggest that it change lanes to avoid the traffic jam in the particular lane.

In some implementations, the remote computing system 705 may consider other types of data in addition to the sensor data payloads. For instance, the remote computing system 705 may access weather data and/or traffic data associated with the current or future environment in which the vehicle is, or may at some point, operate.

As the data is calculated in an aggregate form on the remote computing system 705, the vehicle 710 can utilize one or more models 725 with the connected vehicles on the network and continuously update driving scenarios without requiring a full system OTA update for vehicles within this network.

In an embodiment, the models 725 may be unsupervised or supervised learning models similar to those that may run onboard the vehicle (e.g., for autonomy functions, ADAS functions, personalization features). In some examples, the models 725 may include one or more machine-learned models. For example, the models 725 may include a machine-learned model trained to determine the time/distance limit of the vehicle. In another example, the models 725 may include machine-learned models that are trained to detect the existence of (or predict the future existence of) certain conditions that would trigger one or more comfort features onboard the vehicle. Additionally, or alternatively, the models 725 may include the models included in the autonomy system for perception, object movement prediction, motion planning, or other autonomy functions.

The models 725 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

As further described herein, the models 725 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s).

In some implementations, the model trainers may perform supervised training techniques using labeled training data. By way of example, the training data may include labelled image frames that have labels indicating objects with the vehicle's environment. This can be used for training models 725 to perform the perception functions of the autonomy system. In some examples, the training data may include simulated training data (e.g., training data obtained from simulated scenarios, inputs, configurations, etc.).

Additionally, or alternatively, the model trainers may perform unsupervised training techniques using unlabeled training data. By way of example, the model trainers may train one or more components of a machine-learned model to perform solar irradiance detection through unsupervised training techniques using an objective function (e.g., costs, rewards, heuristics, constraints, etc.). In some implementations, the model trainers may perform a number of generalization techniques to improve the generalization capability of the models being trained. Generalization techniques include weight decays, dropouts, or other techniques.

In some implementations, the vehicle computing system 605 or the remote computing system 705 can generate a ranking of the computations that have been offloaded to the remote computing system 705 by various vehicles within the fleet. This can help the respective computing system prioritize the various requests across the plurality of vehicles. For example, the data sent to the remote computing system 705 may be processed using a Head Unit (HU) algorithm to rank the requested computations in risk batches, whereby the total priority order of the data transmitted via the algorithm through the vehicle hardware is defined by the required energy usage for each computation. In some implementations, the higher the energy usage, the higher priority the data receives in the transmission, assuming other parameters described herein are within acceptable limits to support transmission.

The remote computing system 705 may generate a processed data payload 730 based on the sensor data included in the sensor data payload 675 and the fleet data 720. The processed data payload 730 may include one or more results of the offboard computation 710. By way of example, the remote computing system 705 may perform the offboard computation 710 to complete a complex re-routing or motion planning task for the vehicle with respect to intersection 810. The time limit and distance limit (and energy efficiency) may permit offloading of this type of computation.

In performing its analysis, the remote computing system 705 may utilize one or more of its models 725. This may include machine-learned route generation or vehicle trajectory generation models. The models 725 may also ingest the sensor data from other vehicles (e.g., encoded in fleet data 720) that was previously captured when the other vehicles were proximate to intersection 810. The output of the models 725 may include an updated route or vehicle trajectory. The processed data payload 730 may reflect this output. For example, the processed data payload 730 may encode instructions, text strings, etc. for the vehicle computing system 605 to process for implementing the updated route or trajectory.

The vehicle computing system 605 may obtain, from the remote computing system 705, the processed data payload 730 generated by the remote computing system 705 performing the computation 640 (as an offboard computation 710) using the sensor data payload 675. The vehicle computing system 605 may obtain the processed data payload 730 over a communication network. In some implementations, the vehicle computing system 605 may obtain the processed data payload 730 from an intermediate computing system (e.g., infrastructure, another vehicle, another cloud-based system).

The vehicle computing system 605 may perform a vehicle function 680 based on the processed data payload 730. More particularly, the vehicle computing system 605 can analyze the processed data payload 730 to identify the data, instructions, etc. encoded therein. The vehicle function 680 may include a function that is performed onboard the vehicle. This may include autonomy functions, ADAS functions, vehicle component control, vehicle motion control, implementing personalized preferences For example, the instructions encoded in the processed data payload 730 may indicate an updated route. The updated route may have been determined by the remote computing system 705 based on the fleet data 720 identifying a traffic jam at a future location along the vehicle's route. The instructions in the processed data payload 730 may also include updated vehicle trajectories for performing a left turn at the intersection 810, as well as yield instructions for avoiding oncoming traffic. The vehicle computing system 605 may process this information and pass it along to the vehicle's autonomy system or otherwise process it to generate data that may be utilized by the vehicle's autonomy system for implementation. The autonomy system may provide signals to one or more vehicle control systems 685 to implement the updated route and trajectory. This can include the controllers 355A-C or an interface thereof.

In some implementations, data can be provided for presentation as content on a user interface 695 of a display 690. The data provided for presentation as content on a user interface 695 can be based on the processed data payload 730. The display 690 may be, include, or be included with the display device 345, within the head unit 347. The user interface 695 may be a map interface for vehicle navigation. The user interface 695 may present the various comfort functions of the vehicle (e.g., seat heat, seat massage, AC, sunroof, etc.) and the status/setting of each function. The user interface 695 may present content that represents the autonomy functions of the vehicle such as the bounding boxes of the objects perceived by the vehicle, the predicted movement of the objects (e.g., with leading arrows), or the vehicle's trajectory.

In some implementations, the display 690 can be the display device 500 of the user device 115. In this way, the user device 115 may present content associated with the offboard computation 710, the processed data payload 730, etc.

In some implementations, the vehicle computing system 605 may offload, at least a portion of, the computation 640 to a user device 735. Doing so may divert some computing power from the vehicle to the user device 735 while also allowing the vehicle computing system 605 to leverage the additional computing resources of the user device 735.

The user device 735 may represent the user device 115 described with respect to FIG. 1. For instance, the user device 735 may be a user device of a driver, a passenger, or another user of the vehicle. This can include a mobile phone that is running a native embedded OS function, download app, etc. associated with the vehicle. The user device 735 may include computing resources such as one or more processors 755, memory, communication interfaces, etc. Example components of a user device are further described with reference to FIG. 12.

To offload the computation 640 (or a portion thereof) to the user device 735, the vehicle computing system 605 may provide at least a portion of the sensor data payload 675 to the user device 735. By way of example, the vehicle computing system 605 may be connected to the user device 735 by a wired (e.g., cable, USB, USB-C) or a wireless connection (e.g., Bluetooth®, wlan, radio wave connection, etc.). The connection may be established between the user device 735 and the vehicle computing system 605 when the user device 735 is within range of the vehicle and the systems have paired with one another. The vehicle computing system 605 may divert at least a portion of the computation 640 via this connection locally for optimization.

The user device 735 may process the sensor data payload 675 to perform, at least a portion of, the computation 640 for the vehicle computing system 605 using its processors 755. In some implementations, the user device 735 may use one or more models similar to those of models 725.

The user device 735 may return a processed data payload to the vehicle computing system 605. The vehicle computing system 605 may obtain the processed data payload from the user device 735 and utilize the process data payload as similarly described herein with respect to the processed data payload 730 from the remote computing system 705. In some implementations, the vehicle computing system 605 may combine the processed data payload from the user device 735 with the processed data payload 730 from the remote computing system 705 or process them to perform a vehicle function 680 based on the processed data payload from the user device 735 and the processed data payload 730 from the remote computing system 705.

In some implementations, the remote computing system 705 may offload, at least a portion of, the offboard computation 710 to a third-party computing system 765. In doing so, the remote computing system 705 may share or split the computing resources of the two systems for performing the offboard computation 710. This type of "offline" load balancing may allow computational loads to be distributed between multiple computing systems that are remote from the vehicle computing system 200, for example, in the event that additional computing resources are desirable (e.g., for increased speed, due to a high volume of requests from vehicles).

The third-party computing system 765 may represent the third-party computing platform 125 of FIG. 1. For example, the third-party computing system 765 may include one or more API gateways and one or more APIs for calling one or more backend services of the third-party computing system 765. In an example, the third-party computing system 765 may include a fallback computing service that is available in the event the remote computing system 705 is overloaded or would benefit from additional computing resources. The service may be configured to run or access models similar to those of models 725, for performing the offboard computation 710.

The remote computing system 705 may request for the third-party computing system 765 to perform, at least a portion of, the offboard computation 710. For example, the vehicle computing system 605 may provide the sensor data payload 675 to the remote computing system 705. Concurrently, the remote computing system 705 may receive requests from several other vehicle computing systems to perform computing tasks.

To ensure that these requests are performed efficiently, the remote computing system 705 may call an API via an API gateway to request that a service of the third-party computing system 765 perform, at least a portion of, the offboard computation 710. This approach allows the remote computing system 705 to communicate with the third-party computing system 765, rather than the vehicle computing system 605 also having to do so. This can allow for more efficient delivery of information and responses because the vehicle computing system 605 may have more limited onboard communication resources than the offline systems. Thus, the vehicle computing system 605 can save its network bandwidth, power, etc. by providing signals to the remote computing system 705, without needing to also communicate with the third-party computing system 765, and vice versa. This helps save latency and data transmission time/cost. Additionally, this helps streamline the vehicle's technical stack (e.g., software layer 210) because the vehicle computing system 605 does not need to include onboard logic (e.g., SDKs) for communicating with the third-party computing system 765.

In some implementations, the vehicle computing system 605 may determine that the computation 640 is to be split among the computing resources of the remote computing system 705 and another system/device (e.g., the third-party computing system 765, user device 735). In an example, the vehicle computing system 605 may send two separate signals (e.g., sensor data payloads) to the remote computing system 705 with a request for one of those signals to be routed to the third-party computing system 765. In this way, the vehicle computing system 605 need only communicate with a single remote entity, while still receiving the technical benefit of distributed computation.

The remote computing system 705 may provide, at least a portion of, the sensor data payload 675 (or a processed version thereof) to the third-party computing system 765. The third-party computing system 765 may include the appropriate security protocols and policies to ensure that any data is protected in the manner like that of the remote computing system 705. The portion of the sensor data 675 provided to the third-party computing system 765 can include the portion that is needed to perform the task being requested by the remote computing system 705 (e.g., the portion of the offboard computation 710).

The third-party computing system 765 may process the sensor data payload 675 (or the portion thereof) and return a processed data payload to the remote computing system 705. For instance, the third-party computing system 765 may input sensor data into a machine-learned model associated with planning the vehicle's route and return a suggested route update to the remote computing system 705 via a processed data payload.

The remote computing system 705 may obtain the processed data payload from the third-party computing system 765 and transmit it to the vehicle computing system 605. The response obtained from the third-party computing system 765 may be included in the processed data payload 730 or transmitted separately to the vehicle computing system 605.

In some implementations, the remote computing system 705 may function as a pass-through computing entity and route the processed data payload obtain from the third-party computing system 765 to the vehicle computing system 605, with little to no intermediate processing by the remote computing system 705.

In some implementations, the remote computing system 705 may analyze the processed data payload provided by the remote computing system 765 before communicating it to the vehicle computing system 605. This can include analyzing the received data to confirm accuracy, validate the response, adjust the data format for transmittal to the vehicle computing system 605, etc. This may also, or alternatively, include inputting data received from the third-party computing system 765 into one or more of the models 725.

In some implementations, the remote computing system 705 may aggregate the data obtained from the third-party computing system 765 with its own generated data. For instance, the remote computing system 705 may request that the third-party computing system 765 perform a portion of the offboard computation 710 (e.g., for routing during a first map segment, within a first map tile). The remote computing system 705 may perform another portion of the offboard computation 710 (e.g., for routing during a second map segment, within a second map tile). The remote computing system 705 may combine the output from the third-party computing system 765 with an output of the models 725. The remote computing system 705 may package the combined result and transmit it to the vehicle computing system 605 in the processed data payload 730.

In some implementations, the user device 735 may offload, at least a portion of, a computation to the remote computing system 735, or vice versa. The user device 735 or the remote computing system 735 may offload, at least a portion of, a computation to the other system in addition to, or alternatively from, offloading, at least a portion of, the computation to the third-party computing system 765.

The determination to offload a computation to a respective system/device of FIG. 6 may be based on the type of system/device. By way of example, the vehicle computing system 605 may provide a more computationally intensive task to the remote computing system 705 because its servers 715 may provide more robust processing capability than the processors 755 of the user device 735. In another example, the vehicle computing system 605 may provide a smaller, discrete computation to the user device 735 because it can be quickly performed and returned to the vehicle computing system 605 over a near field communication protocol.

The determination to offload a computation to a respective system/device of FIG. 6 may be based on the available computing resources of the respective system/device. For instance, the vehicle computing system 605 may determine to offload the computation 640 to the user device 735 in the event that the processing resources available at the remote computing system 705 are already taken and the processing queue is longer than the time it would take for the user device 735 to perform the computation 640.

The remote computing system 705 may determine which (or the size of the) portion of the offboard computation 710 to offload to the third-party computing system 764 (and/or the user device 735) based on the processing resources that are available. For instance, the greater the amount of processing resources available at the third-party computing system 765, the larger the portion of the offboard computation 710 may be offloaded to the third-party computing system 765.

The vehicle computing system 605 may aggregate the results/data generated by the various systems/devices. In an example, the vehicle computing system 605 may offload a portion of the computation 640 to the user device 735 and another portion to the remote computing system 705. The vehicle computing system 605 may aggregate the results provided by each of the systems and perform a vehicle function (e.g., updated routing) based on the aggregated results.

FIG. 9 illustrates a diagram of an example method 900 for intelligently distributing and performing computations across a computing ecosystem that includes a vehicle according to an embodiment hereof. The method 900 may be performed by a computing system described with reference to the other figures. In an embodiment, the method 900 may be performed by the vehicle computing system 605, the remote computing system 705, or a control circuit thereof. One or more portions of the method 900 may be implemented as an algorithm on the hardware components of the devices described herein (e.g., as in FIGS. 1-6, 12, etc.). For example, the steps of method 900 may be implemented as operations/instructions that are executable by computing hardware.

FIG. 9 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures for example illustrated purposes and is not meant to be limiting. One or more portions of method 900 may be performed additionally, or alternatively, by other systems. For example, while the method 900 may be described as being performed by a control circuit of the vehicle computing system 605, one or more steps of method 900 may be performed by the remote computing system 705 (e.g., a computing platform 110), the user device 115, and so on.

In an embodiment, the method 900 may begin with or otherwise include an operation 905, in which the vehicle computing system 605 obtains sensor data 610 associated with a vehicle. As described herein, this may include accessing, from a memory, sensor data acquired via the vehicle's onboard sensors. The sensor data 610 may include internal sensor data indicative of conditions within/onboard the vehicle (e.g., current battery level, battery health, occupancy, weight, component health/status). The sensor data 610 may include external sensor data indicative of the vehicle's environment. This may include, for example, LIDAR data, RADAR data, camera data, audio data, temperature data, humidity data, or other types of data indicative of the external environment of the vehicle.

In an embodiment, the method 900 may include an operation 910, in which the vehicle computing system 605 determines an estimated energy usage for performing a computation 640 onboard the vehicle using the sensor data 610. As described herein, the estimated energy usage may be indicative of an estimated amount of energy from one or more batteries 655 of the vehicle for performing the computation 640 (onboard the vehicle) using the sensor data 610.

The vehicle computing system 605 may determine an energy efficiency associated with offloading the computation to the remote computing system 705. The energy efficiency may indicate an estimated energy savings of the one or more batteries of the vehicle by offloading the computation to the remote computing system 705. As described herein, this can include the amount of battery power that would be used to perform the computation via the vehicle's onboard computers minus the battery power needed to package the data for transmission offboard and receive the result of the offboard computation.

By way of example, the sensor data 610 may indicate that the vehicle is traveling to an area of higher traffic, although its current stretch of road may include less traffic. The sensor data 610 may also indicate that it has started to rain. This combination of conditions may trigger an automated personalization setting, whereby one or more vehicle components (e.g., seat massage, windows, seat heaters, etc.) are to be adjusted. The vehicle computing system 605 may determine a first value indicating how much battery power it may take to perform the computation to determine the preferred combination of vehicle settings given this combination of detected conditions. The vehicle computing system 605 may determine a second value indicating how much battery power it would take to send the data to a remote computing system 705 to perform the computation, as well as process the result. The vehicle computing system 605 may subtract the second value from the first value to determine the estimated energy usage associated with the personalization computation.

In another example, the vehicle may be an autonomous vehicle. The autonomous vehicle may be travelling on a stretch of road with little to no surrounding objects. Thus, the vehicle computing system 605 may determine how much battery power it may save by offloading certain autonomy computations related to vehicle routing and vehicle motion planning. As described herein, the vehicle computing system 605 may determine the estimated energy savings by subtracting the estimated amount of battery power needed to package data for transmission off the vehicle from the estimated amount of battery power needed to perform the routing/motion planning onboard the vehicle.

In an embodiment, the method 900 may include an operation 915, in which the vehicle computing system 605 determines one or more other parameters associated with the vehicle. The other parameters may provide information that is useful for the vehicle computing system 605 when determining whether or not to offload a computation 640 to a remote computing system 705.

For example, FIG. 10 illustrates a flowchart diagram of an example method 1000 for computing parameters associated with the vehicle. In an embodiment, the method 1000 may begin with or otherwise include an operation 1005, in which the vehicle computing system 605 obtains map data or other data associated with the vehicle's environment. The other data can include weather data or traffic data. In some implementations, the vehicle computing system 605 may obtain data from another vehicle (via V2V communication) or from surrounding infrastructure. Such data can include, for example, sensor data captured from the other vehicle or traffic signal information from the infrastructure.

In an embodiment, the method 1000 may include an operation 1010, in which the vehicle computing system 605 determines at least one of a time duration 635, time limit, or distance limit for performing a computation.

For example, the vehicle computing system 605 may determine a time duration 635 for performing the computation 640 onboard the vehicle using the sensor data 610. The vehicle computing system 605 may determine the time duration 635 by accessing a data structure that provides pervious processing times for like computations using like sensor data.

Additionally, or alternatively, the vehicle computing system 605 may determine at least one of a time limit or a distance limit for performing the computation 640 using the sensor data 610. For instance, based on the current position of the vehicle and the map data, the vehicle computing system 605 may determine that the vehicle has X minutes or Y miles until it approaches an intersection, by which it should complete a vehicle routing/motion planning computation. In another example, weather data may help indicate that the vehicle has X minutes or Y miles until the vehicle encounters rain, snow, or other inclement weather conditions.

In an embodiment, the method 1000 may include an operation 1015, in which the vehicle computing system 605 obtains data indicative of a signal strength of a communication network. The communication network may be one with which the vehicle is currently connected to or a network that the vehicle may be connected to at a future time.

In an embodiment, the method 1000 may include an operation 1020, in which the vehicle computing system 605 may determine the signal strength of the communication network. For example, the vehicle computing system 605 may process the data indicative of the signal strength to determine whether the data signal is sufficiently strong to transmit data to a remote computing system 705, within an appropriate timeframe (e.g., given the time duration, time/distance constraints).

In an embodiment, the method 1000 may include an operation 1025, in which the vehicle computing system 605, based on the sensor data 610, determines a quality of the sensor data. For instance, the vehicle computing system 605 may analyze LIDAR data to compute its density as well as any error values to determine whether it is of a threshold level of quality to perform a given function.

Returning to FIG. 9, in an embodiment, the method 1000 may include an operation 920, in which, the vehicle computing system 605 determines whether to perform the computation 640 onboard the vehicle or to offload the computation 640 to a remote computing system 705. To do so, the vehicle computing system 605 can utilize an algorithm that helps weigh the various parameters to help determine the feasibility and energy efficiency associated with the computation being performed by the remote computing system 705, instead of the vehicle computing system 605.

Figure 11:
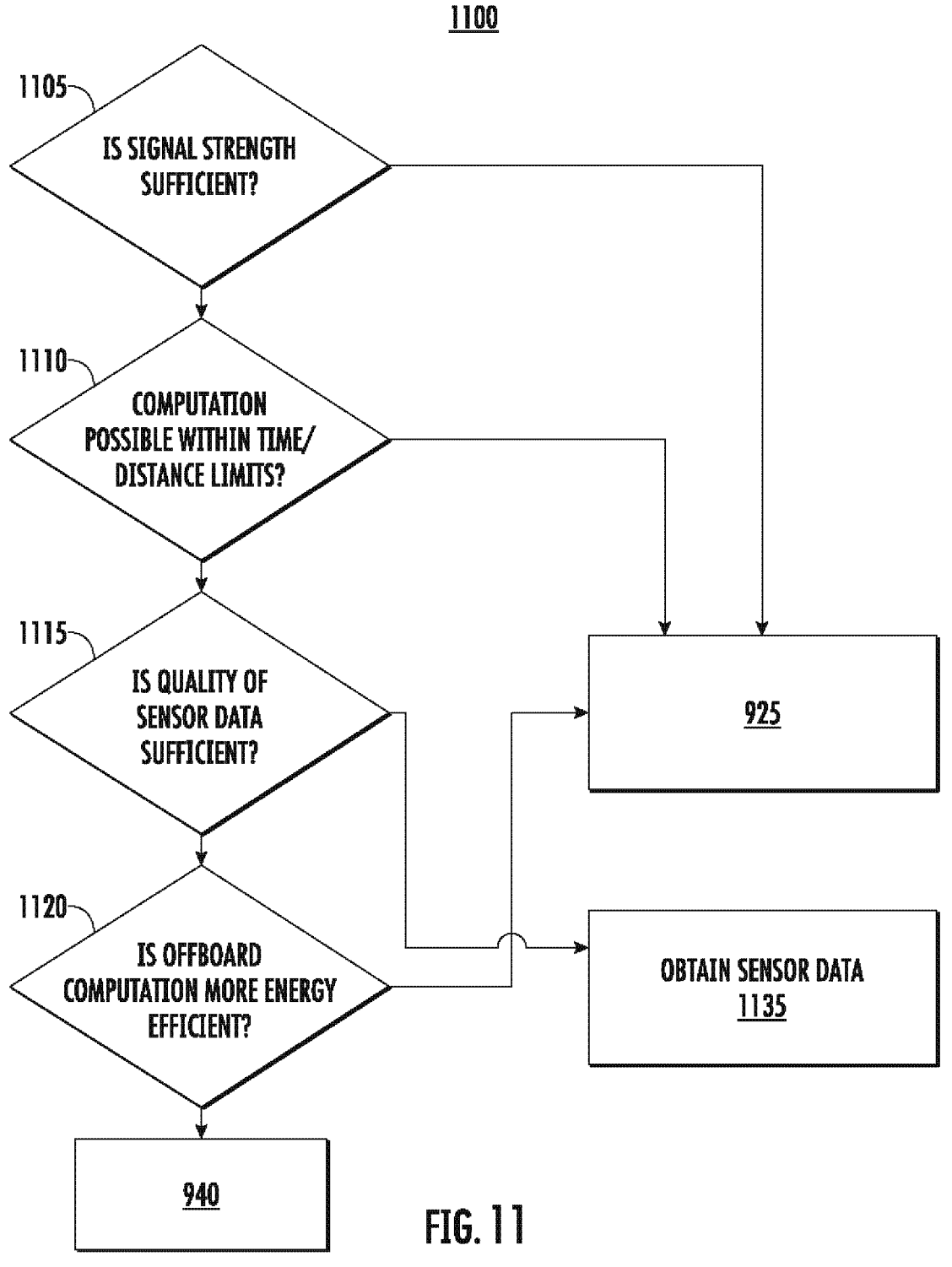

FIG. 11 illustrates a flowchart diagram of an example method 1100 for determine whether to perform a computation onboard a vehicle or offboard the computation. The method 110 can represent the algorithm running onboard the vehicle to determine whether or not to offload a computation to a remote computing system 705. For example, as shown, the vehicle computing system 605 can evaluate the various parameters and determine whether it would be feasible and energy efficient for the computation to be performed remotely from the vehicle.

In an embodiment, the method 1100 may begin with or otherwise include an operation 1105, in which the vehicle computing system 605 determines whether the signal strength associated with a communication network is sufficient for transmitting a sensor data payload 675 to a remote computing system 705. For example, the vehicle computing system 605 may compare the determined signal strength of the communication network (e.g., a cellular network) to a signal strength threshold. The signal strength threshold can represent the minimum signal strength needed for a sensor data payload 675 to be successfully transmitted to the remote computing system 705 using the communication network, given its size (e.g., MB, GB, etc.) and within a reasonable timeframe. The reasonable timeframe can be computed based on any time limits for performing the computation.

In the event that the signal strength deviates from (e.g., is below) the signal strength threshold, the vehicle computing system 605 may determine that the computation 640 using the sensor data 610 is to be performed onboard the vehicle, at 925. This is because the weak signal strength makes it infeasible to transmit a communication to the remote computing system 705 in time for the remote computing system 705 to perform the computation 640.

As shown in the FIG. 9, in an embodiment, the method 900 may include an operation 930, in which the vehicle computing system 605 performs the computation 640 onboard the vehicle. This can include processing the sensor data 610 to detect a certain set of conditions and automatically determine the settings for the vehicle comfort functions that align with the user's preferences.

In an embodiment, the method 900 may include an operation 935, in which the vehicle computing system 605 performs a vehicle function based on the computation 640. For instance, data signals may be outputted to the controllers associated with the vehicle comfort functions to activate the related components (e.g., seat massage, close windows) and implement the determined settings.

Returning to FIG. 11, in the event that the signal strength is above the signal strength threshold, the vehicle computing system 605 may continue to evaluate other parameters associated with the vehicle to help determine whether to perform the computation 640 onboard or offboard the vehicle.

In an embodiment, the method 1100 may include an operation 1110, in which the vehicle computing system 605 determines whether it is possible to offload the computation 640 to the remote computing system based on the time limit or distance limit for doing so. For instance, the vehicle computing system 605 may determine that within 2 minutes the weather and traffic level is predicted to change to heavy rain and dense traffic. Thus, the vehicle computing system 605 may determine whether a computation 640 to determine the combination of vehicle's comfort features to activate for the user's preferences can be completed by a remote computing system 705 in this timeframe. To help do so, the vehicle computing system 605 may determine an estimated time duration for the user personalization computation (e.g., based on similar computations performed in the past) and compare the estimated time duration to the time limit (e.g., 2 minutes). This analysis may also take into account the signal strength of the communication network to determine any latency introduced by offloading the personalization computation to the remote computing system 705.

In the event that the computation 640 may not be performed by the remote computing system 705 and the results returned to the vehicle within the time/distance limit (or that estimated energy usage highly deviates from the historical data), the vehicle computing system 605 can determine the computation is to be performed onboard the vehicle, at 925.

In the event that the computation 640 may be performed by the remote computing system 705 and the results returned to the vehicle within the time/distance limit, the vehicle computing system 605 may continue to evaluate the other parameters.

In an embodiment, the method 1100 may include an operation 1115, in which the vehicle computing system 605 determines whether the quality of the sensor data 610 is sufficient to be able to perform the computation 640. For instance, in the event that the calculated quality metric 645 is below a threshold (e.g., because the sensor data 610 is too sparse, the associated confidence is too low), the vehicle computing system 605 may obtain additional sensor data, at 1135.

In the event that the calculated quality metric 645 is above a threshold (e.g., the frequency/amount of sensor data 610 is sufficient, the associated confidence is sufficient), the vehicle computing system 605 may continue to evaluate the other parameters.

In an embodiment, the method 1100 may include an operation 1120, in which the vehicle computing system 605 may determine whether it would be more energy efficient for the computation 640 to be performed offboard the vehicle. For instance, the vehicle computing system 605 may determine the estimated amount of battery power it would take to perform the user personalization computation using the vehicle's onboard computing resources. The vehicle computing system 605 may determine the estimated amount of battery power it would take to generate a sensor data payload 675, transmit it to the remote computing system 705, and receive/process any returned data. Based on these estimates, the vehicle computing system 605 may determine the potential battery power that would be saved by offloading the personalization computation. As described herein, these estimated can be computed based on historical data indicating past battery usage for like computations.

The vehicle computing system 605 can determine whether there is a deviance in the estimated energy usage. For example, in the event that the amount of saved battery power is below a threshold (e.g., a higher deviance), the vehicle computing system 605 may determine that the estimated energy usage would not support offloading the computation 640. In response, the vehicle computing system 605 may determine that the personalization computation is to be performed onboard the vehicle, at 1130.

In the event that the amount of saved battery power is above a threshold (e.g., a lower deviance), the vehicle computing system 605 may determine that the estimated energy usage would support offloading the computation 640.

Returning to FIG. 9, in an embodiment, the method 900 may include an operation 940, in which the vehicle computing system 605, based on the evaluation of the one or more parameters described in the algorithm of FIG. 11, determines that the computation 640 is to be offloaded to the remote computing system 705. For instance, the vehicle computing system 605 may determine, based on the time duration 635 for performing the computation onboard the vehicle, that the performance of the computation using the sensor data 610 is to be offloaded to the remote computing system 705. Additionally, or alternatively, the vehicle computing system 506 may determine, based on at least one of the time limit or the distance limit, that the performance of the computation using the sensor data 610 is to be offloaded to the remote computing system 705. Additionally, or alternatively, the vehicle computing system 605 may determine, based on the signal strength, that the performance of the computation using the sensor data 610 is to be offloaded to the remote computing system 705. Additionally, or alternatively, the vehicle computing system may determine, based on the quality of the sensor data 610, that the performance of the computation using the sensor data 610 is to be offloaded to the remote computing system 705.

By way of example, if a signal strength meets or exceeds acceptable deviances, the sensor data quality indicates the sensor data is usable, the computation can be performed within any time/distance limits, and the estimated energy usage is higher—the vehicle computing system 605 may determine that a user personalization computation (or autonomy computation) is to be offloaded to the remote computing system 705.

As described herein, the computation may be offboarded to one or more computing systems/devices. For example, the vehicle computing system 605 may determine to offload a less intensive computation to a user device 735 that is connected to the vehicle computing system 605 (e.g., via a Bluetooth®). The vehicle computing system 605 may determine to offload a larger, more intensive computation to a remote computing system 705 over a network.

In an embodiment, the method 1100 may include an operation 945, in which the vehicle computing system 605 may, in response to determining that the computation using the sensor data 610 is to be offloaded to the remote computing system 705, generate a sensor data payload 675 indicative of the sensor data 610. As described herein, the sensor data payload 675 may be raw sensor data and/or generated to be a lightweight representation thereof. For instance, the sensor data payload 675 may include one or more text strings indicative of the sensor data 610.

In an embodiment, the method 1100 may include an operation 950, in which the vehicle computing system 605 may output, over a communication network, the sensor data payload 675 to the remote computing system 705. For example, the vehicle computing system 605 may transmit the sensor data payload 675 over a cellular network to the remote computing system 705. In some implementations, the vehicle computing system 605 may transmit the sensor data payload 675 over a cellular network to an intermediate system such as, for example, another vehicle, infrastructure computer, cloud system, etc.

The remote computing system 705 may perform the computation using the sensor data payload 675 as well as models similar to those downloaded to onboard the vehicle.

However, the remote computing system 705 may do so with faster, or a higher number of, processors than onboard the vehicle.

In some implementations, the remote computing system 705 may perform the computation using sensor data from one or more other vehicles. For example, the remote computing system 705 may obtain sensor data from a plurality of vehicles, the sensor data including respective sensor data acquired by a respective vehicle of the plurality of vehicles. For instance, a fleet of vehicles within a geographic area may capture sensor data of their surrounding environment as they traverse the geographic area or while parked. This information may be utilized in the computation performed by the remote computing system 706, as described herein.

In some implementations, the remote computing system 705 may leverage the computing resources of a third-party computing system 765. For example, the remote computing system 705 may access an API to generate and submit a request to the third-party computing system 765 to perform, at least a portion, of the computation. The remote computing system 705 may provide data to the third-party computing system 765 so that the third-party computing system 765 may perform the requested computation. The transmitted data may include, at least a portion of, the sensor data payload 675 or data contained therein (e.g., sensor data 610 from the vehicle).

The remote computing system 705 may obtain a response from the third-party computing system 765. The response may include a result of the offloaded computation. The remote computing system 705 may generate the processed data payload 730 based on the response from the third-party computing system 765. As described herein, this may include an aggregation of data generated by the remote computing system 705 and the third-party computing system 765.

In an embodiment, the method 1100 may include an operation 955, in which the vehicle computing system 605 may obtain, from the remote computing system 705, a processed data payload 730 generated by the remote computing system 705 performing the computation using the sensor data payload 675. As described herein, the processed data payload 730 may include instructions for the vehicle as a result of the computation. This may include, for example, updated routing instructions, vehicle trajectory instructions, instructions to activate a certain combination of comfort settings, etc.

The processed data payload may be based on sensor data acquired by one or more other vehicles. This can include processing sensor data from other vehicle's that are (or have already) traveled in an area where the vehicle is headed.

In the event that the computation was offloaded to a plurality of systems/devices, the vehicle computing system 605 may aggregate the results received from the respective systems.

In an embodiment, the method 1100 may include an operation 955, in which the vehicle computing system 605 may perform a vehicle function based on the processed data payload 730. For instance, the vehicle computing system 605 may initiate the performance of an autonomy function, personalization function, ADAS function, etc. based on the result of the offboard computation. In some implementations, the vehicle computing system 605 may obtain the processed data payload 730, analyze it for implementation onboard the vehicle, and issue signals to the associated vehicle components (e.g., controllers for certain comfort features). In some implementations, the processed data payload 730 may be directly implemented by an associated vehicle component (e.g., a routing module).

In some implementations, the processed data payload 730 may include a partial result of the offboard computation that may help alleviate the computational load of the onboard computer. For example, the processed data payload 730 may be indicative of a plurality of trajectory options for the vehicle and the vehicle's autonomy system may select which trajectory to implement.

As previously described herein, the method 1100 may include an operation 925, in which the vehicle computing system 605 may determine that the computation 640 using the sensor data 610 is to be perform onboard the vehicle. This may arise in the event the estimated energy usage is minimal and, thus, there are not significant battery power savings from offloading the computation.

In such an embodiment, the method 1100 may include operations 930 and 935, in which the vehicle computing system 605 may perform the computation 640 onboard the vehicle and perform a vehicle function 680 based on the computation 640. This can include, for example, determining which vehicle comfort features to activate based on a change in the vehicle's external environment and providing signals to instruct the associated controllers to activate those features.

Figure 12:
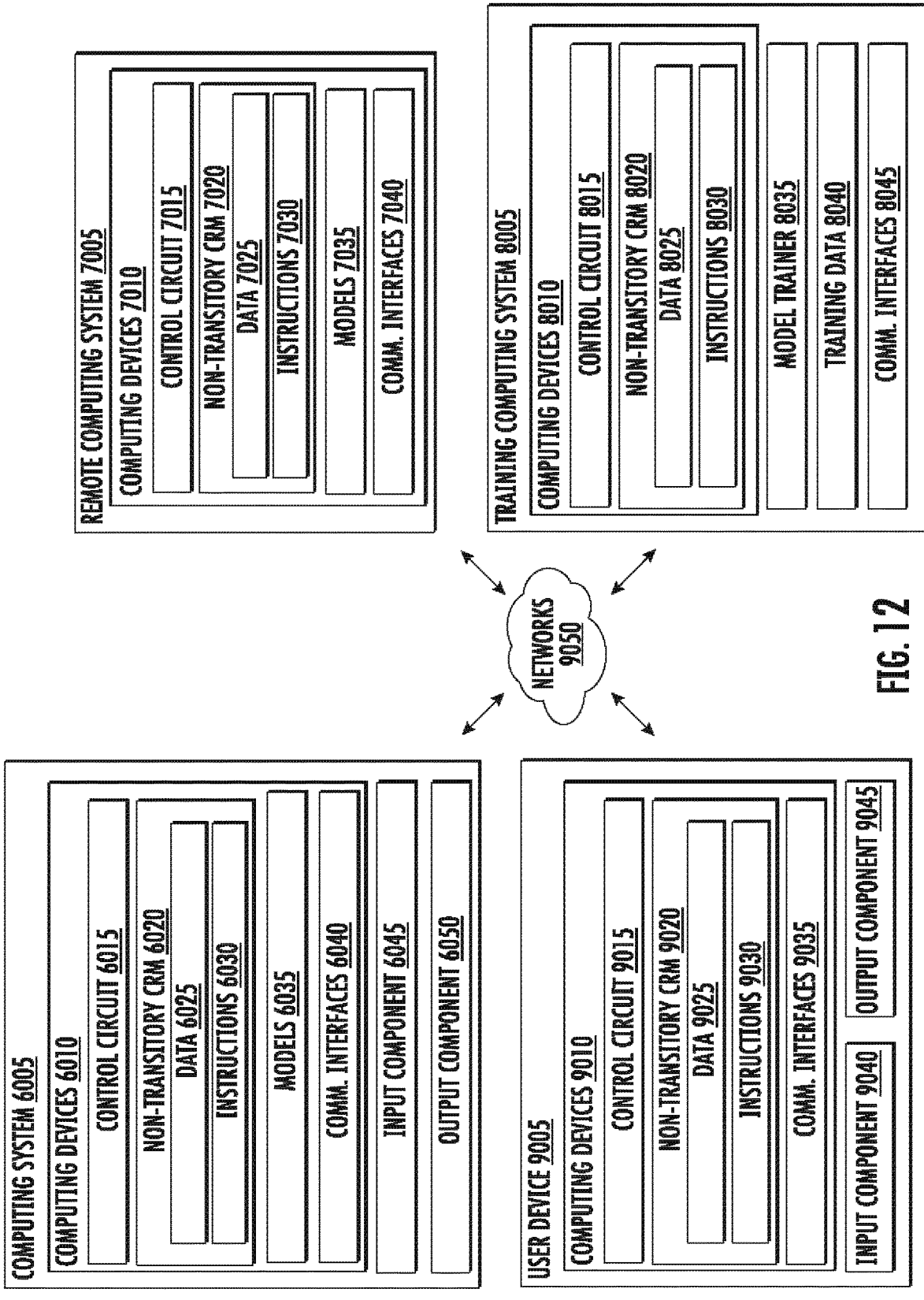
FIG. 12 illustrates a diagram of an example computing ecosystem with computing components according to an embodiment hereof.

FIG. 12 illustrates a block diagram of an example computing system 1200 according to an embodiment hereof. The system 1200 includes a computing system 6005 (e.g., a computing system onboard a vehicle), a remote computing system 7005 (e.g., a server computing system, cloud computing platform), a user device 9005 (e.g., a user's mobile device), and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipulated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 6015 to perform one or more functional tasks. The modules and computer-readable/executable instructions may be described as performing various operations or tasks when the control circuit 6015 or other hardware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to perform any of the operations, methods and/or processes described herein. In some cases, the non-transitory computer-readable medium 6020 may store computer-executable instructions or computer-readable instructions, such as instructions to perform at least a portion of the method of FIGS. 9-11.

In an embodiment, the computing system 6005 may store or include one or more machine-learned models 6035. For example, the machine-learned models 6035 may be or may otherwise include various machine-learned models. In an embodiment, the machine-learned models 6035 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative models, such as stable diffusion models, generative adversarial networks (GAN), GPT models, and other suitable models.

In an aspect of the present disclosure, the models 6035 may be used for performing autonomy functions for the vehicle, supporting ADAS functions, performing personalization functions for a driver/passenger of the vehicle, or other functions associated with the vehicle. For example, the models 6035 may include a model for detecting and identifying objects around the vehicle, a model for predicting the movement of such objects, and a model for generating vehicle paths to avoid the objects. In another example, the models 6035 may include a model for automated lane maintenance, object presence warning generation, etc. In another example, the models 6035 may include a clustering model for detecting conditions that trigger automated settings to align with user preferences for certain vehicle comfort functions (e.g., seat temperature, music). The models 6035 can ingest sensor data or other data (e.g., map data) to generate outputs for the vehicle functions.

In an embodiment, the one or more machine-learned models 6035 may be received from the remote computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the remote computing system 7005 as a portion of a web service. Thus, one or more models 6035 may be stored and/or implemented (e.g., as models 7035) at the computing system 6005 and/or one or more models 6035 may be stored and implemented at the remote computing system 7005.

The computing system 6005 may include one or more communication interfaces 6040. The communication interfaces 6040 may be used to communicate with one or more other systems. The communication interfaces 6040 may include any circuits, components, software, etc. for communicating via one or more networks (e.g., networks 9050). In some implementations, the communication interfaces 6040 may include for example, one or more of a communications controller, receiver, transceiver, transmitter, port, conductors, software and/or hardware for communicating data/information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, projector, tablet, and/or other suitable display components.

The remote computing system 7005 may include one or more computing devices 7010. In an embodiment, the remote computing system 7005 may include or is otherwise implemented by one or more server computing devices. In instances in which the remote computing system 7005 includes plural server computing devices, such server computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium 7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the methods of FIGS. 9-11.

As described herein, the remote computing system may store one or more models 7035. The models 7035 may include the models 6035 (or copies thereof) that run onboard a vehicle. This may include machine-learned models that are configured to support the performance of vehicle functions.

The remote computing system 7005 may include one or more communication interfaces 7040. The communication interfaces 7040 may be used to communicate with one or more other systems. The communication interfaces 7040 may include any circuits, components, software, etc. for communicating via one or more networks (e.g., networks 7050). In some implementations, the communication interfaces 7040 may include for example, one or more of a communications controller, receiver, transceiver, transmitter, port, conductors, software and/or hardware for communicating data/information.

The computing system 6005 and/or the remote computing system 7005 may train the models 6035, 7035 via interaction with the training computing system 8005 that is communicatively coupled over the networks 9050. The training computing system 8005 may be separate from the remote computing system 7005 or may be a portion of the remote computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to train models, to execute models to perform at least a portion of the method of FIGS. 9-11, etc.

The training computing system 8005 may include a model trainer 8035 that trains the machine-learned models 6035, 7035 stored at the computing system 6005 and/or the remote computing system 7005 using various training or learning techniques.

The training computing system 8005 may modify parameters of the models 6035, 7035 based on the loss function such that the models 6035, 7035 may be effectively trained for specific applications in a supervised manner using labeled data and/or in an unsupervised manner.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the method of FIG. 11.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

ADDITIONAL DISCUSSION OF VARIOUS EMBODIMENTS

Embodiment 1 relates to a computing system of a vehicle. In this embodiment, the computing system includes a control circuit including one or more processors configured to perform operations to cause the computing system to: obtain sensor data associated with the vehicle; determine an estimated energy usage for performing a computation onboard the vehicle using the sensor data, wherein the estimated energy usage is indicative of an estimated amount of energy from one or more batteries of the vehicle for performing the computation using the sensor data; based on the estimated energy usage, determine that performance of the computation using the sensor data is to be offloaded to a remote computing system that is remote from the vehicle; in response to determining that the computation using the sensor data is to be offloaded to the remote computing system, generate a sensor data payload indicative of the sensor data; and output, over a communication network, the sensor data payload to the remote computing system.

Embodiment 2 includes the computing system of Embodiment 1. In this embodiment, the one or more processors are further configured to perform operations to cause the computing system to: obtain, from the remote computing system, a processed data payload generated by the remote computing system performing the computation using the sensor data payload; and perform a vehicle function based on the processed data payload.

Embodiment 3 includes the computing system of any of Embodiments 1 or 2. In this embodiment, the vehicle is an autonomous vehicle, and the vehicle function is an autonomy function of the autonomous vehicle.

Embodiment 4 includes the computing system of any of Embodiments 1 to 3. In this embodiment, the one or more processors are further configured to perform operations to cause the computing system to: determine a time duration for performing the computation onboard the vehicle using the sensor data; and determine, also based on the time duration for performing the computation onboard the vehicle, that the performance of the computation using the sensor data is to be offloaded to the remote computing system.

Embodiment 5 includes the computing system of any of Embodiments 1 to 4. In this embodiment, the one or more processors are further configured to perform operations to cause the computing system to: determine at least one of a time limit or a distance limit for performing the computation using the sensor data; and determine, also based on at least one of the time limit or the distance limit, that the performance of the computation using the sensor data is to be offloaded to the remote computing system.

Embodiment 6 includes the computing system of any of Embodiments 1 to 5. In this embodiment, the one or more processors are further configured to perform operations to cause the computing system to: determine a signal strength of the communication network; and determine, also based on the signal strength, that the performance of the computation using the sensor data is to be offloaded to the remote computing system.

Embodiment 7 includes the computing system of any of Embodiments 1 to 6. In this embodiment, the one or more processors are further configured to perform operations to cause the computing system to: determine a quality of the sensor data; and determine, also based on the quality of the sensor data, that the performance of the computation using the sensor data is to be offloaded to the remote computing system.

Embodiment 8 includes the computing system of any of Embodiments 1 to 7. In this embodiment, outputting the sensor data payload to the remote computing system includes outputting the sensor data payload to an intermediate computing system.

Embodiment 9 includes the computing system of any of Embodiments 1 to 8. In this embodiment, the processed data payload is based on sensor data acquired by one or more other vehicles.

Embodiment 10 includes the computing system of any of Embodiments 1 to 9. In this embodiment, the sensor data payload includes one or more text strings indicative of the sensor data.

Embodiment 11 includes the computing system of any of Embodiments 1 to 10. In this embodiment, to determine that the performance of the computation using the sensor data is to be offloaded to the remote computing system, the one or more processors are configured to perform operations to cause the computing system to: determine an energy efficiency associated with offloading the computation to the remote computing system, the energy efficiency indicating an estimated energy savings of the one or more batteries of the vehicle by offloading the computation to the remote computing system.

Embodiment 12 includes a computer-implemented method. The method includes obtaining sensor data associated with the vehicle. The method includes determining an estimated energy usage for performing a computation onboard the vehicle using the sensor data, wherein the estimated energy usage is indicative of an estimated amount of energy from one or more batteries of the vehicle for performing the computation using the sensor data. The method includes, based on the estimated energy usage, determining that performance of the computation using the sensor data is to be offloaded to a remote computing system that is remote from the vehicle. The method includes, in response to determining that the computation using the sensor data is to be offloaded to the remote computing system, generating a sensor data payload indicative of the sensor data. The method includes outputting, over a communication network, the sensor data payload to the remote computing system.

Embodiment 13 includes the computing system of Embodiment 12. In this embodiment, the method includes obtaining, from the remote computing system, a processed data payload generated by the remote computing system performing the computation using the sensor data payload; and performing a vehicle function based on the processed data payload.

Embodiment 14 includes the computing system of any of Embodiments 12 or 13. In this embodiment, the method includes determining a time duration for performing the computation onboard the vehicle using the sensor data, and determining that the performance of the computation using the sensor data is to be offloaded to the remote computing system includes determining that the performance of the computation using the sensor data is to be offloaded to the remote computing system also based on the time duration.

Embodiment 15 includes the computing system of any of Embodiments 12 to 14. In this embodiment, the method includes determining at least one of a time limit or a distance limit for performing the computation using the sensor data; and determining that the performance of the computation using the sensor data is to be offloaded to the remote computing system includes determining that the performance of the computation using the sensor data is to be offloaded to the remote computing system also based on at least one of the time limit or the distance limit.

Embodiment 16 includes the computing system of any of Embodiments 12 to 15. In this embodiment, the method includes determining a signal strength of the communication network; and determining that the performance of the computation using the sensor data is to be offloaded to the remote computing system includes determining that the performance of the computation using the sensor data is to be offloaded to the remote computing system also based on the signal strength of the communication network.

Embodiment 17 includes the computing system of any of Embodiments 12 to 16. In this embodiment, the method includes determining a quality of the sensor data; and determining that the performance of the computation using the sensor data is to be offloaded to the remote computing system includes determining that the performance of the computation using the sensor data is to be offloaded to the remote computing system also based the quality of the sensor data.

Embodiment 18 includes the computing system of any of Embodiments 12 to 17. In this embodiment, the processed data payload is based on sensor data acquired by one or more other vehicles.

Embodiment 19 includes the computing system of any of Embodiments 12 to 18. In this embodiment, the sensor data payload includes one or more text strings indicative of the sensor data.

Embodiment 20 includes one or more non-transitory computer-readable media that store instructions that are executable by one or more processors of a control circuit to: obtain sensor data associated with the vehicle; determine an estimated energy usage for performing a computation onboard the vehicle using the sensor data, wherein the estimated energy usage is indicative of an estimated amount of energy from one or more batteries of the vehicle for performing the computation using the sensor data; based on the estimated energy usage, determine that performance of the computation using the sensor data is to be offloaded to a remote computing system that is remote from the vehicle; in response to determining that the computation using the sensor data is to be offloaded to the remote computing system, generate a sensor data payload indicative of the sensor data; and output, over a communication network, the sensor data payload to the remote computing system.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

Computing tasks and operations discussed herein as being performed at or by computing device(s) remote from the vehicle can instead be performed at the vehicle (e.g., via the vehicle computing system), or vice versa.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system of a vehicle comprising:
a control circuit comprising one or more processors configured to perform operations to cause the computing system to:
obtain sensor data associated with the vehicle;
determine an estimated energy usage for performing a computation onboard the vehicle using the sensor data, wherein the estimated energy usage is indicative of an estimated amount of energy from one or more batteries of the vehicle for performing the computation using the sensor data;
based on the estimated energy usage, determine that performance of the computation using the sensor data is to be offloaded to a remote computing system that is remote from the vehicle;
in response to determining that the computation using the sensor data is to be offloaded to the remote computing system, generate a sensor data payload indicative of the sensor data; and
output, over a communication network, the sensor data payload to the remote computing system.

2. The computing system of claim 1, wherein the one or more processors are further configured to perform operations to cause the computing system to:
obtain, from the remote computing system, a processed data payload generated by the remote computing system performing the computation using the sensor data payload; and
perform a vehicle function based on the processed data payload.

3. The computing system of claim 2, wherein the vehicle is an autonomous vehicle, and the vehicle function is an autonomy function of the autonomous vehicle.

4. The computing system of claim 1, wherein the one or more processors are further configured to perform operations to cause the computing system to:
determine a time duration for performing the computation onboard the vehicle using the sensor data; and
determine, also based on the time duration for performing the computation onboard the vehicle, that the performance of the computation using the sensor data is to be offloaded to the remote computing system.

5. The computing system of claim 1, wherein the one or more processors are further configured to perform operations to cause the computing system to:
determine at least one of a time limit or a distance limit for performing the computation using the sensor data; and
determine, also based on at least one of the time limit or the distance limit, that the performance of the computation using the sensor data is to be offloaded to the remote computing system.

6. The computing system of claim 1, wherein the one or more processors are further configured to perform operations to cause the computing system to:

determine a signal strength of the communication net-
work; and determine, also based on the signal strength, that the
performance of the computation using the sensor data
is to be offloaded to the remote computing system.

7. The computing system of claim 1, wherein the one or
more processors are further configured to perform opera-
tions to cause the computing system to:

determine a quality of the sensor data; and determine, also based on the quality of the sensor data,
that the performance of the computation using the
sensor data is to be offloaded to the remote computing
system.

8. The computing system of claim 1, wherein outputting
the sensor data payload to the remote computing system
comprises outputting the sensor data payload to an interme-
diate computing system.

9. The computing system of claim 1, wherein the pro-
cessed data payload is based on sensor data acquired by one
or more other vehicles.

10. The computing system of claim 1, wherein the sensor
data payload comprises one or more text strings indicative of
the sensor data.

11. The computing system of claim 1, wherein to deter-
mine that the performance of the computation using the
sensor data is to be offloaded to the remote computing
system, the one or more processors are configured to per-
form operations to cause the computing system to:

determine an energy efficiency associated with offloading
the computation to the remote computing system, the
energy efficiency indicating an estimated energy sav-
ings of the one or more batteries of the vehicle by
offloading the computation to the remote computing
system.

12. A computer-implemented method comprising:

obtaining sensor data associated with the vehicle;

determining an estimated energy usage for performing a
computation onboard the vehicle using the sensor data,
wherein the estimated energy usage is indicative of an
estimated amount of energy from one or more batteries
of the vehicle for performing the computation using the
sensor data;

based on the estimated energy usage, determining that
performance of the computation using the sensor data
is to be offloaded to a remote computing system that is
remote from the vehicle;

in response to determining that the computation using the
sensor data is to be offloaded to the remote computing
system, generating a sensor data payload indicative of
the sensor data; and outputting, over a communication network, the sensor
data payload to the remote computing system.

13. The computer-implemented method of claim 12, fur-
ther comprising:

obtaining, from the remote computing system, a pro-
cessed data payload generated by the remote computing
system performing the computation using the sensor
data payload; and performing a vehicle function based on the processed data
payload.

14. The computer-implemented method of claim 12, fur-
ther comprising:

determining a time duration for performing the compu-
tation onboard the vehicle using the sensor data; and wherein determining that the performance of the compu-
tation using the sensor data is to be offloaded to the
remote computing system comprises determining that
the performance of the computation using the sensor
data is to be offloaded to the remote computing system
also based on the time duration.

15. The computer-implemented method of claim 12, fur-
ther comprising:

determining at least one of a time limit or a distance limit
for performing the computation using the sensor data;
and wherein determining that the performance of the compu-
tation using the sensor data is to be offloaded to the
remote computing system comprises determining that
the performance of the computation using the sensor
data is to be offloaded to the remote computing system
also based on at least one of the time limit or the
distance limit.

16. The computer-implemented method of claim 12, fur-
ther comprising:

determining a signal strength of the communication net-
work; and wherein determining that the performance of the compu-
tation using the sensor data is to be offloaded to the
remote computing system comprises determining that
the performance of the computation using the sensor
data is to be offloaded to the remote computing system
also based on the signal strength of the communication
network.

17. The computer-implemented method of claim 12, fur-
ther comprising:

determining a quality of the sensor data; and wherein determining that the performance of the compu-
tation using the sensor data is to be offloaded to the
remote computing system comprises determining that
the performance of the computation using the sensor
data is to be offloaded to the remote computing system
based the quality of the sensor data.

18. The computer-implemented method of claim 12,
wherein the processed data payload is based on sensor data
acquired by one or more other vehicles.

19. The computer-implemented method of claim 12,
wherein the sensor data payload comprises one or more text
strings indicative of the sensor data.

20. One or more non-transitory computer-readable media
that store instructions that are executable by one or more
processors of a control circuit to:

obtain sensor data associated with the vehicle;

determine an estimated energy usage for performing a
computation onboard the vehicle using the sensor data,
wherein the estimated energy usage is indicative of an
estimated amount of energy from one or more batteries
of the vehicle for performing the computation using the
sensor data;

based on the estimated energy usage, determine that
performance of the computation using the sensor data
is to be offloaded to a remote computing system that is
remote from the vehicle;

in response to determining that the computation using the
sensor data is to be offloaded to the remote computing
system, generate a sensor data payload indicative of the
sensor data; and output, over a communication network, the sensor data
payload to the remote computing system.

* * * * *